United States Patent  
Day et al.

(10) Patent No.: US 11,161,456 B1
(45) Date of Patent: Nov. 2, 2021

(54) USING THE IMAGE FROM A REAR VIEW CAMERA IN A THREE-CAMERA ELECTRONIC MIRROR SYSTEM TO PROVIDE EARLY DETECTION OF ON-COMING CYCLISTS IN A BIKE LANE

(71) Applicant: Ambarella International LP, Santa Clara, CA (US)

(72) Inventors: Christopher N. Day, Los Gatos, CA (US); Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/821,881

(22) Filed: Mar. 17, 2020

(51) Int. Cl.
*B60R 1/08* (2006.01)
*B60R 1/12* (2006.01)

(52) U.S. Cl.
CPC .................. *B60R 1/08* (2013.01); *B60R 1/12* (2013.01); *B60R 2300/105* (2013.01); *B60R 2300/107* (2013.01); *B60R 2300/80* (2013.01)

(58) Field of Classification Search
CPC ....... B60R 1/08; B60R 1/12; B60R 2300/105; B60R 2300/107; B60R 2300/80
See application file for complete search history.

(56) References Cited

U.S. PATENT DOCUMENTS

| | | | | |
|---|---|---|---|---|
| 2016/0129836 | A1* | 5/2016 | Sugita | B62D 15/0295 701/41 |
| 2018/0079356 | A1* | 3/2018 | Watanabe | B60Q 1/50 |
| 2018/0213162 | A1* | 7/2018 | Tsutsumitake | G06T 11/60 |
| 2019/0299986 | A1* | 10/2019 | Saito | B60K 28/10 |
| 2019/0351824 | A1* | 11/2019 | Kim | G06K 9/00805 |

* cited by examiner

*Primary Examiner* — Hesham K Abouzahra
(74) *Attorney, Agent, or Firm* — Christopher P. Maiorana, PC

(57) ABSTRACT

An apparatus including cameras and a processor. The cameras may generate pixel data of an exterior view from a vehicle. The processor may generate video frames from each of the cameras, perform computer vision operations on the video frames to detect an object, determine a predicted path of the object with respect to the vehicle, predict an approach side of the vehicle of the object based on the predicted path, and generate a notification in response to the predicted path. A first of the cameras may be on the approach side of the vehicle. The object may not be in a field of view captured by the first camera. The object may be detected in the video frames captured by a second of the cameras that may not be on the approach side of the vehicle. The notification may be generated before the object may be in the field of view.

20 Claims, 12 Drawing Sheets

FIG. 10

```
650
  │
  ▼
652 START
  │
  ▼
654 PERFORM COMPUTER VISION OPERATIONS ON REAR VIEW VIDEO FRAME
  │
  ▼
656 HAS OBJECT BEEN DETECTED? ──NO──▶ 658 END
  │
  YES
  ▼
660 DETERMINE CHARACTERISTICS OF DETECTED OBJECT FOR FIRST VIDEO FRAME
  │
  ▼
662 PERFORM COMPUTER VISION OPERATIONS ON NEXT REAR VIEW VIDEO FRAME
  │
  ▼
664 DETERMINE CHARACTERISTICS OF DETECTED OBJECT FOR NEXT VIDEO FRAME
  │
  ▼
666 COMPARE CHARACTERISTICS FROM FIRST VIDEO FRAME TO CHARACTERISTICS OF NEXT VIDEO FRAME
  │
  ▼
668 IS OBJECT MOVING? ──YES──▶ 670 DETERMINE SPEED AND DIRECTION OF MOVING OBJECT
  │                                      │
  NO                                     ▼
  │                             672 COMPARE SPEED AND DIRECTION TO ROAD CHARACTERISTICS
  │                                      │
  │                                      ▼
  │                             674 DETERMINE PREDICTED PATH OF MOVING OBJECT
  │                                      │
  │                                      ▼
  │                             676 UPDATE PREDICTED PATH USING DATA FROM NEW VIDEO FRAMES
  │                                      │
  ▼                                      ▼
                                678 END
```

USING THE IMAGE FROM A REAR VIEW CAMERA IN A THREE-CAMERA ELECTRONIC MIRROR SYSTEM TO PROVIDE EARLY DETECTION OF ON-COMING CYCLISTS IN A BIKE LANE

FIELD OF THE INVENTION

The invention relates to computer vision generally and, more particularly, to a method and/or apparatus for implementing using the image from a rear view camera in a three-camera electronic mirror system to provide early detection of on-coming cyclists in a bike lane.

BACKGROUND

As video cameras are increasingly used on vehicles to supplant or enhance rear and side view mirrors, the new technology can be used to solve problems with traditional reflective mirrors. Curved roads are a common issue when a driver is looking behind a vehicle using a reflective rear view mirror. Since the road is curved, moving objects following on the curved road cannot be seen in some of the rear and side view mirrors. For example, when a vehicle is stopped at a light and waiting to take a right turn on a road with a bend, a cyclist coming up from behind (i.e., in a bike lane on the passenger side of the vehicle) would not be visible in the side view mirror until very close to the vehicle. Because of the bend in the road, the cyclist would appear suddenly from behind the vehicle. If a driver has already started to turn into the bike lane to make the right turn before the cyclist is visible, there is potential for impeding the cyclist or causing an accident.

Generally, cameras used to enable electronic mirrors in vehicles are mounted to provide a similar view as the traditional reflective side view mirror. Enhancing a side view mirror with a camera that can detect objects would not provide an advanced warning to the driver because the field of view of a camera is similar to the reflective view in the side view mirror. If the cyclist is approaching the vehicle from behind, the driver may not get sufficient notice of the incoming cyclist. Even with object detection, if the object appears suddenly in the field of view of the camera, there may not be enough time to provide sufficient notice to the driver. Existing sensing modalities, such as blind spot detecting radar, do not work well since radars lack the required resolution to accurately detect and classify cyclists. Similar to how the view of the road is blocked by the body of the vehicle on a curved road, the range of the radar signal would be blocked by the vehicle.

It would be desirable to implement using the image from a rear view camera in a three-camera electronic mirror system to provide early detection of on-coming cyclists in a bike lane.

SUMMARY

The invention concerns an apparatus comprising a plurality of capture devices and a processor. The plurality of capture devices may each be configured to generate pixel data corresponding to an exterior view from a vehicle. The processor may be configured to generate video frames corresponding to each of the plurality of capture devices from the pixel data, perform computer vision operations on the video frames to detect a moving object in the video frames, determine a predicted path of the moving object with respect to the vehicle, predict an approach side of the vehicle of the moving object based on the predicted path of the moving object, and generate a notification in response to the predicted path. A first of the plurality of capture devices may be located on the approach side of the vehicle. A current location of the moving object may not be in a field of view of the video frames generated from the pixel data captured by the first of the capture devices. The moving object may be detected in the video frames generated from the pixel data captured by a second of the plurality of capture devices that may be not located on the approach side of the vehicle. The notification may be generated before the moving object may be in the field of view.

BRIEF DESCRIPTION OF THE FIGURES

Embodiments of the invention will be apparent from the following detailed description and the appended claims and drawings.

FIG. 10 is a flow diagram illustrating a method for determining a predicted path of an object.

DETAILED DESCRIPTION OF THE EMBODIMENTS

Figure 1:
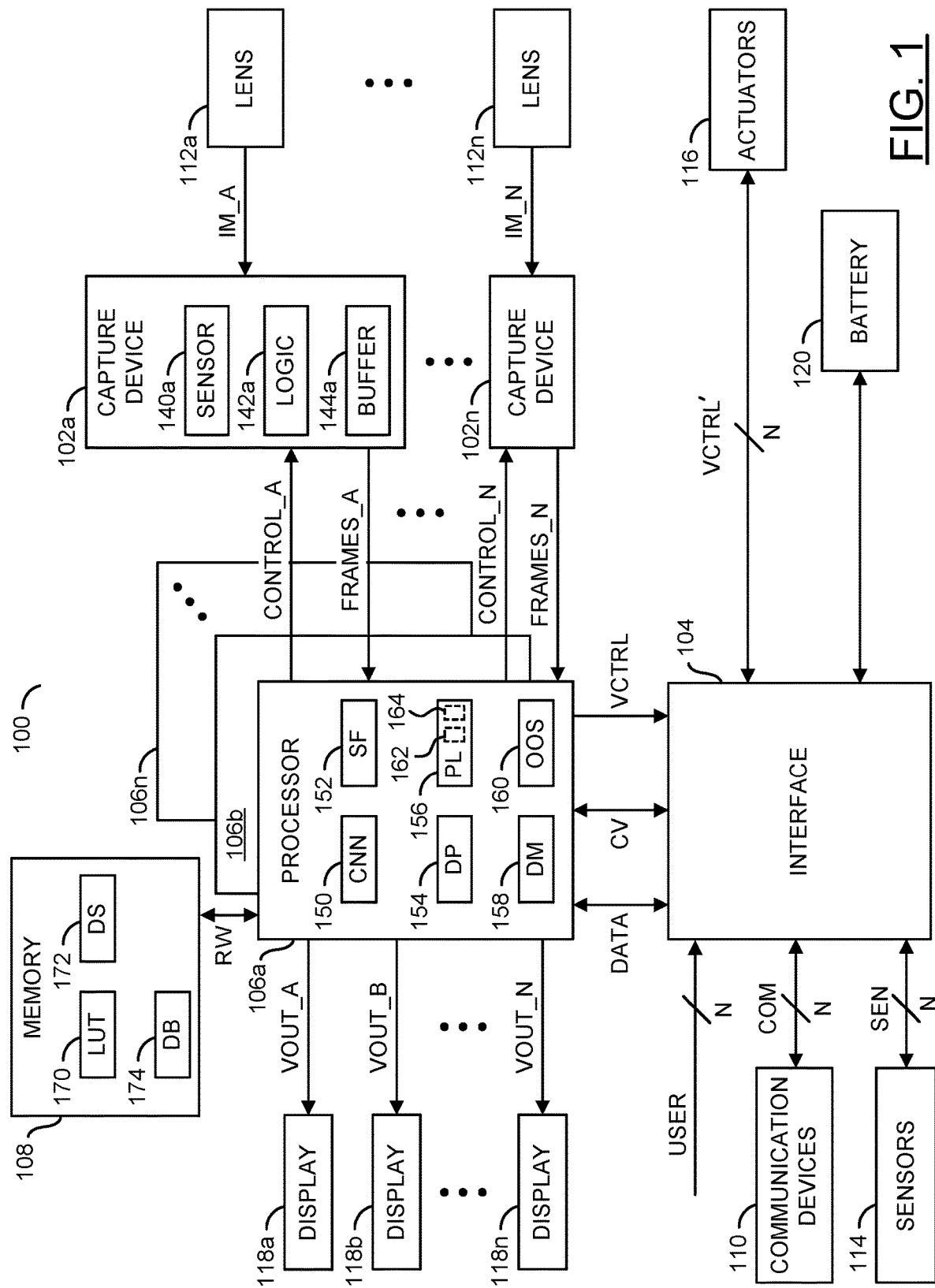
FIG. 1 is a diagram illustrating an embodiment of the present invention.

Embodiments of the present invention include providing using the image from a rear view camera in a three-camera electronic mirror system to provide early detection of on-coming cyclists in a bike lane that may (i) detect moving objects, (ii) predict a path of moving objects, (iii) determine which side of a vehicle a moving object will approach from, (iv) detect objects in video frames from one camera to provide an advanced warning before the same object is visible in video frames from another camera, (v) provide a notification that the moving object is approaching the vehicle, (vi) prevent a door from opening when a moving object is approaching, (vii) determine whether the moving object will be visible in a camera with sufficient time for the driver to react and/or (viii) be implemented as one or more integrated circuits.

Embodiments of the present invention may be configured to implement an electronic mirror system for an ego vehicle that may provide an early warning system for moving objects. The electronic mirror system may comprise capture devices (e.g., cameras) mounted to various locations on the ego vehicle that may capture pixel data of an environment near (e.g., exterior to) the ego vehicle. In an example, the electronic mirror system may comprise at least a three camera electronic mirror system that provides rear facing camera views.

The rear facing camera views may enable an early warning about objects approaching an ego vehicle. The electronic mirror system may be configured to implement computer vision to detect objects (e.g., perform object detection). The object detection may enable objects to be recognized and/or categorized as particular objects. The object detection may be performed over a sequence of video frames to determine characteristics of the object such as speed, direction, acceleration, etc. Embodiments of the present invention may use the characteristics of the detected object to determine a predicted path of the object. The predicted path of the object may be compared to the location, direction and/or speed of the ego vehicle to provide an early warning about how the object may approach the ego vehicle.

Embodiments of the present invention may be configured to use data extracted from video frames captured by one camera to augment data extracted from another camera. In an example, a field of view of one camera may be obstructed and/or may not provide useful information about an object (e.g., on a road that curves left a camera mounted on a passenger side may not capture a view of the road behind the ego vehicle). Computer vision operations may be performed on an object using the video data captured by one camera to determine a trajectory of the object before the object is visible in another camera. A notification may be generated to provide the early warning of the object approaching the ego vehicle.

In an example, a rear facing camera (e.g., mounted on a rear end of the ego vehicle) may augment the view captured from a rear facing camera mounted at a side (mirror) location. A cyclist (e.g., the object) may not be visible in the video frames captured by the side camera if the ego vehicle and cyclist are driving along a curved road. The curve of the road may result in the body of the ego vehicle blocking the view of the cyclist on the road behind the ego vehicle from the perspective of the side camera. However, the rear facing camera mounted on the rear end of the ego vehicle may have a wider field of view that is not obscured compared to the side camera. The computer vision operations may be performed to identify (e.g., detect and recognize) the cyclist (or other vehicle such as a motorcycle) and/or calculate a speed of the object. The trajectory (e.g., predicted path) of the object (e.g., the cyclist driving within a bike lane coming up from behind the ego vehicle) may be determined based on the speed and/or direction of the object.

Based on the computer vision operations performed on the video frames captured by the camera mounted on the rear end of the ego vehicle, the electronic mirror display system may provide an alert to the driver about the presence of the cyclist in advance of the cyclist being visible to the side camera. The notification may provide the early warning. Furthermore, embodiments of the present invention may be configured to perform an action in the event that an occupant of the ego vehicle attempts to open a vehicle door when the cyclist is approaching (e.g., sounding an alarm and/or stopping the door being opened).

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location.

For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112*a*-112*n* may each capture and/or focus light as input data (e.g., IM_A-IM_N) and present the respective light input data IM_A-IM_N to a respective one of the capture devices 102*a*-102*n*.

In embodiments implementing many of the lenses 112*a*-112*n*, each of the lenses 112*a*-112*n* may point in a different direction. By having each of the lenses 112*a*-112*n* capture a different direction, the apparatus 100 may capture a panoramic view of the environment and/or the interior of a vehicle. The lenses 112*a*-112*n* may be arranged to capture fields of view above and/or below a level of the vehicle. In some embodiments, lenses 112*a*-112*n* may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118*a*-118*n*).

Each of the capture devices 102*a*-102*n* may comprise one of blocks (or circuits) 140*a*-140*n*, one of blocks (or circuits) 142*a*-142*n* and/or one of blocks (or circuits) 144*a*-144*n*. The blocks 140*a*-140*n* may implement an image sensor (e.g., a camera sensor). The blocks 142*a*-142*n* may implement logic. The blocks 144*a*-144*n* may implement a buffer. For clarity, in the example shown, only the image sensor 140*a*, the logic 142*a* and the buffer 144*a* of the capture device 102*a* are shown. The capture devices 102*a*-102*n* may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102*a*-102*n* may each be configured to generate raw pixel data in response to the signals IM_A-IM_N (e.g., perform a photoelectric conversion). The capture devices 102*a*-102*n* may be configured to present pixel data as an analog signal or as a digital signal (e.g., perform an analog to digital conversion). The capture devices 102*a*-102*n* may capture data received through the lenses 112*a*-112*n* to generate raw pixel data and/or video image data. In an example, the capture devices 102*a*-102*n* may present the raw pixel data in Bayer pattern, RGB, or YUV formats. In some embodiments, the capture devices 102*a*-102*n* may generate video frames. In some embodiments, the capture devices 102*a*-102*n* may generate raw pixel data and the processors 106*a*-106*n* may generate the video frames from the raw pixel data.

The signals FRAMES_A-FRAMES_N may comprise raw pixel data, video frames and/or still images generated by the capture devices 102*a*-102*n* (e.g., video data). In the example shown, the signals FRAMES_A-FRAMES_N (e.g., video frames) may be communicated from the capture devices 102*a*-102*n* to the processors 106*a*-106*n*. In another example, signals comprising the raw pixel data may be communicated from the capture devices 102*a*-102*n* to the processors 106*a*-106*n* and the processors 106*a*-106*n* may generate the signals FRAMES_A-FRAMES_N (e.g., the signals FRAMES_A-FRAMES_N may be generated internal to the processors 106*a*-106*n*). In some embodiments, the capture devices 102*a*-102*n* may be directly connected to the processors 106*a*-106*n*. In some embodiments, the capture devices 102*a*-102*n* may be connected to the processors 106*a*-106*n* by respective cables. In an example, the capture devices 102*a*-102*n* may be connected to the processors 106*a*-106*n* using a serial communication protocol between serializer-deserializer pairs.

In some embodiments, the capture devices 102*a*-102*n* and/or the processors 106*a*-106*n* may be configured to perform depth sensing (e.g., the signals FRAMES_A-FRAMES_N may comprise depth information and/or vector light data in addition to the video frames). In one example, the capture devices 102*a*-102*n* and/or the processors 106*a*-106*n* may perform depth sensing using multiple cameras (e.g., cameras configured as a stereo pair to capture a depth map). In another example, the capture devices 102*a*-102*n* and/or the processors 106*a*-106*n* may perform depth sensing using time-of-flight. In yet another example, the capture devices 102*a*-102*n* and/or the processors 106*a*-106*n* may perform depth sensing using structured light.

The video frames FRAMES_A-FRAMES_N may be presented to one or more of the processors 106*a*-106*n*. The signals CONTROL_A-CONTROL_N may comprise instruction signals for the capture devices 102*a*-102*n* and/or the lenses 112*a*-112*n* (e.g., to zoom, pan, focus, adjust settings, etc.). The signals CONTROL_A-CONTROL_N may be generated by the processors 106*a*-106*n*.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106*a*-106*n*. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106*a*-106*n* and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106*a*-106*n* for the various vehicle actuators 116. The signal CV may represent computer vision data. The signal DATA may represent other data. The number of signals communicated and/or the types of data communicated using the interface 104 may be varied according to the design criteria of a particular implementation.

The processors 106*a*-106*n* may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians). The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102a-102n may be configured as a stereo pair of cameras. The capture devices 102a-102n configured as a stereo pair may be implemented close to each other at a pre-defined distance and/or have a symmetrical orientation about a central location. The capture devices 102a-102n configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106a-106n may detect feature points of the same object detected in both video frames captured by the capture devices 102a-102n configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102a-102n configured as a stereo pair, the disparity engine may be configured to determine a distance. The distance determined by the disparity engine 164 may be the distance from the capture devices 102a-102n configured as a stereo pair. In an example, the disparity engine 164 may determine a distance from the capture devices 102a-102n configured as a stereo pair to a particular object (e.g., a vehicle, a bicycle, a pedestrian, driver, a vehicle occupant, etc.) based on the comparison of the differences in the stereo pair of images captured.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person.

In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth. In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
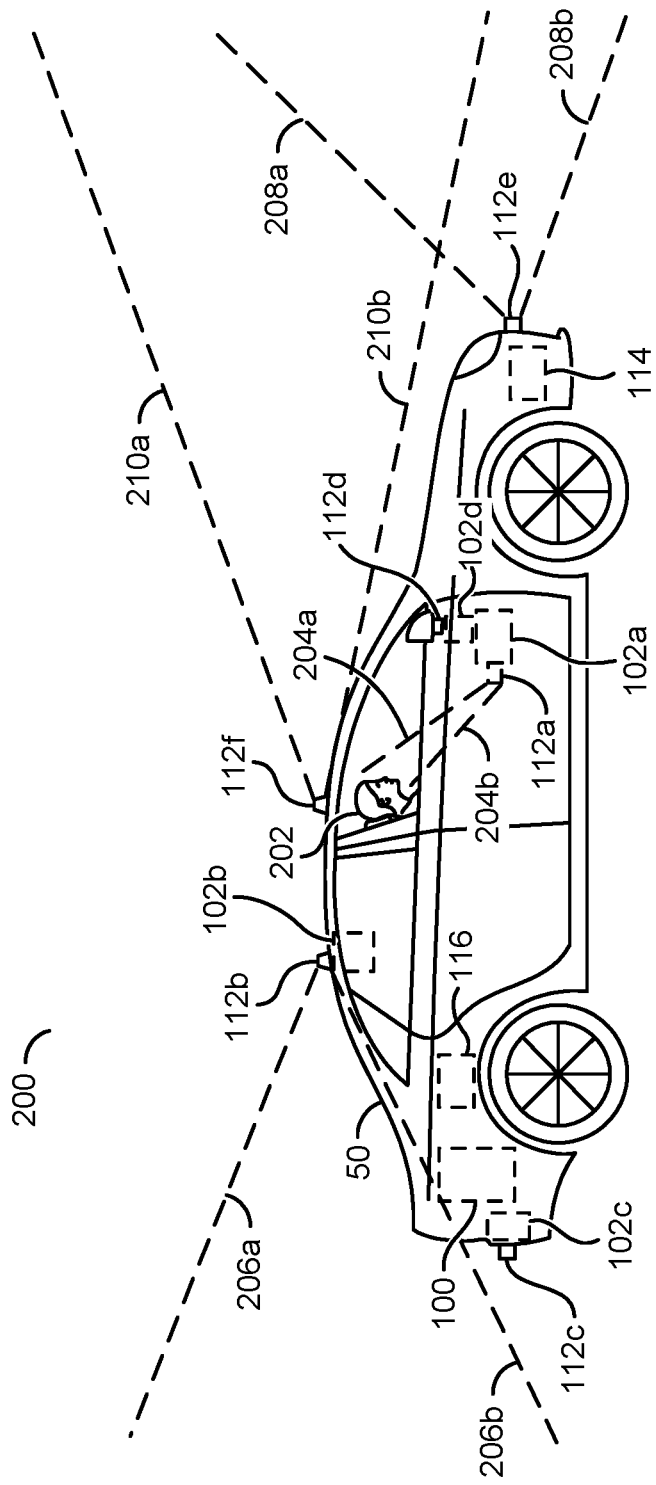
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation. A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50.

Similarly, other cameras may be used to capture video data of a targeted view from the vehicle (e.g., shown as the lens 112*c* and the camera sensor 102*c*, the lens 112*d* and the camera sensor 102*d*, etc.). For example, the targeted view (e.g., represented by a line 208*a* and a line 208*b* captured by the lens 112*e*) may provide a front exterior view of an area. In another example, a redundant targeted view (e.g., represented by a line 210*a* and a line 210*b* captured by the lens 112*f*) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation. The capture devices 102*a*-102*n* may be configured to capture video data of the environment around (e.g., area near) the ego vehicle 50. The processors 106*a*-106*n* may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106*a*-106*n* to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106*a*-106*n* may be varied according to the design criteria of a particular implementation.

The processors 106*a*-106*n* may be configured to analyze the captured video signal. The processors 106*a*-106*n* may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106*a*-106*n* may be configured to determine a presence, an absolute location and/or a relative location of the detected objects. Based on the detected objects, the processors 106*a*-106*n* may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106*a*-106*n*. For example, the data received may comprise external signals generated in response to user input, external signals generated by the sensors 114 and/or internally generated signals such as signals generated by the processors 106*a*-106*n* in response to analysis of the video data and/or objects detected in video data.

The processors 106*a*-106*n* may process video data that may not be seen by a person (e.g., not output to the displays 118*a*-118*n*). For example, the video data may be internal to the processors 106*a*-106*n*. Generally, the processors 106*a*-106*n* perform the computer vision operations in order to interpret the environment to emulate how a person would see the environment and/or provide greater sensory capability than a human. For example, the processors 106*a*-106*n* may interpret the environment in many directions at once (e.g., a 360 degree field of view) while a person has a limited field of view.

The video analytics performed by the processors 106*a*-106*n* may be performed on more than one video frame. For example, the processors 106*a*-106*n* may analyze a series (or sequence) of video frames. In some embodiment, the processors 106*a*-106*n* may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106*a*-106*n* may implement depth-sensing techniques. The depth-sensing techniques may compare knowledge of the dimensions of the ego vehicle 50 to the location and/or body position of the occupants. The processors 106*a*-106*n* may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106*a*-106*n* may be configured to detect faces in a region of a video frame. In some embodiments, facial recognition may be implemented (e.g., based on faces stored as references in the memory 108 and/or an external database accessible by the communication devices 110). In some embodiments, the processors 106*a*-106*n* may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
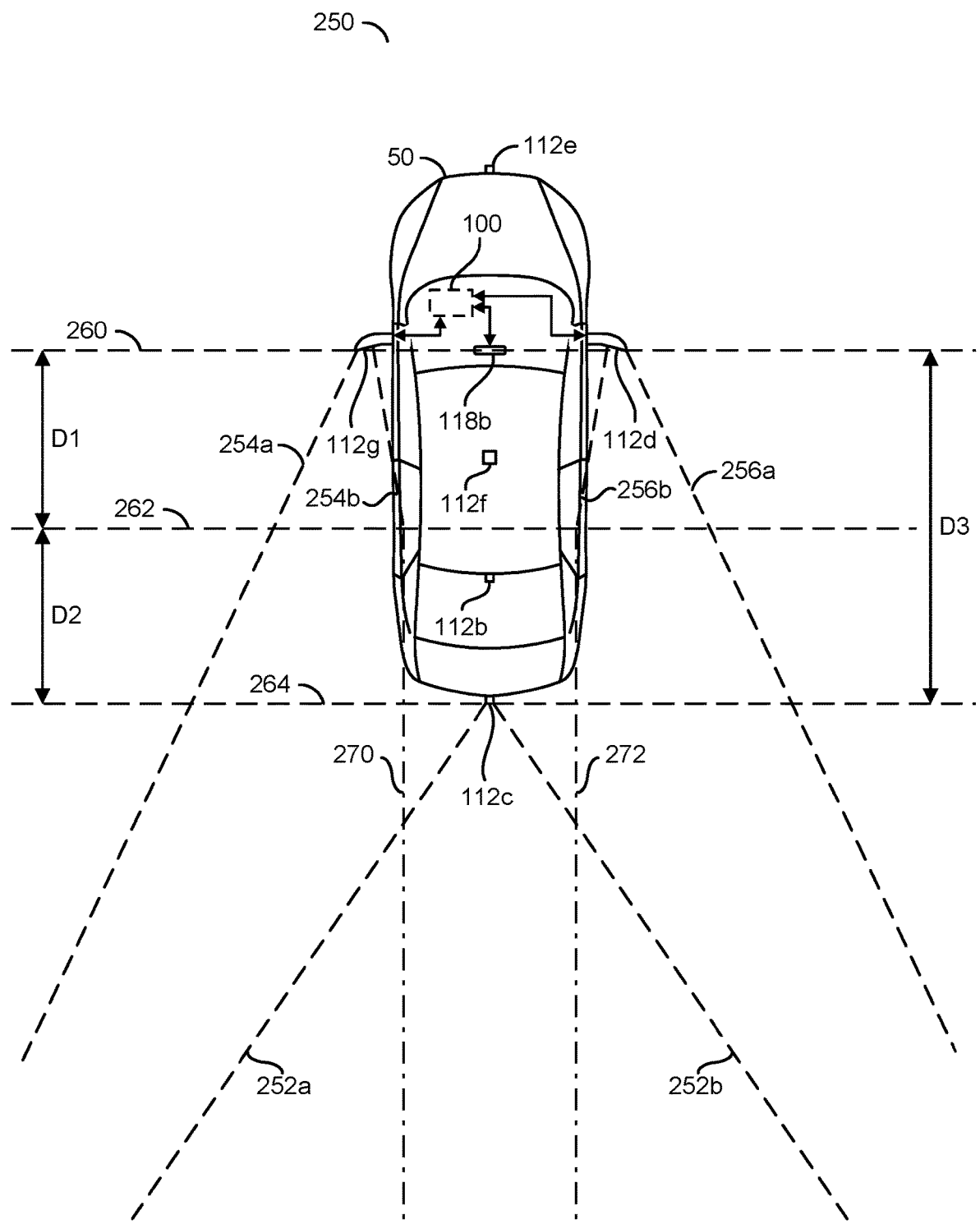
FIG. 3 is a diagram illustrating example fields of view captured by a three camera system mounted on a vehicle.

Referring to FIG. 3, a diagram illustrating example fields of view captured by a three camera system mounted on a vehicle is shown. An overhead view 250 of the ego vehicle 50 is shown. The apparatus 100 is shown within the ego vehicle 50. The lenses 112a-112g are shown on the ego vehicle 50. The display 118b is shown within the ego vehicle 50. While only one display 118b is shown as a representative example, generally the ego vehicle 50 may comprise more than one of the displays 118a-118n.

Each of the lenses 112a-112g may be directed to capture a different field of view. As shown in association with FIG. 2, the lens 112b may capture the field of view 206a-206b, the lens 112e may capture the field of view 208a-208b and the lens 112f may capture the field of view 210a-210b. Dotted lines 252a-252b are shown. The dotted lines 252a-252b may represent the field of view captured by the lens 112c (a width of the field of view is shown directed behind the ego vehicle 50 from the rear bumper location). Dotted lines 254a-254b are shown. The dotted lines 254a-254b may represent the field of view captured by the lens 112g (a width of the field of view is shown directed towards a rear of the ego vehicle 50 from the driver side mirror location). Dotted lines 256a-256b are shown. The dotted lines 256a-256b may represent the field of view captured by the lens 112d (a width of the field of view is shown directed towards a rear of the ego vehicle 50 from the passenger side mirror location). In an example, each of the fields of view captured by the lenses 112a-112g may be presented as video data to the displays 118a-118n and/or analyzed by the processors 106a-106n.

The lenses 112a-112g and the corresponding fields of view (e.g., the fields of view 206a-206b, 208a-208b, 210a-210n 252a-252b, 254a-254b and 256a-256b, etc.) are shown as an illustrative example. More lenses (e.g., the lenses 112a-112n) and/or fields of view may be captured by the apparatus 100. In an example, the field of view lines 252a-252b, 254a-254b and/or 256a-256b may extend from the lenses 112c, 112d and/or 112g at a wider angle (e.g., the lenses 112c, 112d and/or 112g may be wide angle lenses). In another example, the range of each of the capture devices 102a-102n may be different. For example, the physical location of the capture devices 102a-102n on the ego vehicle 50 may determine how far from the ego vehicle 50 each field of view is able to reach. The arrangement of the lens 112c, the lens 112d and/or the lens 112g and/or the field of view 252a-252b, the field of view 254a-254b and/or the field of view 256a-256b may be varied according to the design criteria of a particular implementation.

In some embodiments, a wider-angle (e.g., shorter focal length) rear camera lens 112c may be selected that is different than the side camera lenses (e.g., the lens 112d and the lens 112g). The shorter focal length rear camera lens 112c may be used to effectively perform a rear camera image size reduction. Selecting the shorter focal length for the rear camera lens 112c may result in a down-scaling of the video frames captured by the rear camera 102c in an optical manner rather than as a digital image resizing operation performed by the processors 106a-106n. The shorter focal length rear camera lens 112c may enable the field of view 252a-252b to provide a wider range of coverage than the field of view 254a-254b and/or the field of view 256a-256b.

The fields of view 252a-252b, 254a-254b and/or 256a-256b may represent a field of view of the raw images captured by the cameras. The field of view 252a-252b may partially overlap the field of view 254a-254b. The field of view 252a-252b may partially overlap the field of view 256a-256b. The overlapping of the field of views may result in some objects being captured by multiple cameras at the same time.

A line 260 is shown. The line 260 may be a reference location. The reference location 260 is shown corresponding to a location of the passenger side lens 112d and/or the driver side lens 112g. For example, the reference location 260 may be even with the lens 102d and the lens 102g (e.g., a straight line across the width of the ego vehicle 50 at a same distance along the length of the ego vehicle 50). A line 262 is shown. The line 262 may be a reference location corresponding to a location where the field of view line 256b and the field of view line 254b are blocked by the ego vehicle 50. A line 264 is shown. The line 264 may be a reference location at the rear of the ego vehicle at the location of the rear camera lens 112c.

A distance D1 is shown. The distance D1 may be a distance between the reference location 260 and the reference location 262. A distance D2 is shown. The distance D2 may be a distance between the reference location 262 and the reference location 264. A distance D3 is shown. The distance D3 may be a distance between the reference location 260 and the reference location 264. In the example shown, the distance D1 may be shorter than the distance D3. In an example, there may be approximately a three meter distance between the location of the passenger/driver lenses (e.g., 112d and 112g) and the rear lens 112c.

A portion of the field of view 254a-254b may be blocked (partially obstructed) by the ego vehicle 50 beyond the distance D1. For example, the field of view 254a-254b may extend to the left of the ego vehicle 50 without obstruction (e.g., to the distance D3 and then further behind the ego vehicle 50) and the field of view 254a-254b may extend to the right until being obstructed by the ego vehicle 50 at the distance D1. Using the video frames generated from pixel data captured using the lens 112g to look to the right of the lens 112g beyond the distance D1 may provide a view of the ego vehicle 50 instead of a view behind the ego vehicle 50.

A line 270 is shown. The line 270 may be a reference line. The reference line 270 may extend from an intersection of the line 254b and the reference line 262. In an example, the portion of the field of view 254a-254b of the lens 112g to the left of the line 270 may provide a view of behind the ego vehicle 50 (e.g., on the driver side). In an example, the portion of the field of view 254a-254b of the lens 112g to the right of the line 270 may be obstructed by the ego vehicle 50.

Similarly, a portion of the field of view 256a-256b may be blocked (obstructed) by the ego vehicle 50 beyond the distance D1. For example, the field of view 256a-256b may extend to the right of the ego vehicle 50 without obstruction (e.g., to the distance D3 and then further behind the ego vehicle 50) and the field of view 256a-256b may extend to the left until being obstructed by the ego vehicle 50 at the distance D1. Using the video frames generated from pixel data captured using the lens 112d to look to the left of the lens 112d beyond the distance D1 may provide a view of the ego vehicle 50 instead of a view behind the ego vehicle 50.

A line 272 is shown. The line 272 may be a reference line. The reference line 272 may extend from an intersection of the line 256b and the reference line 262. In an example, the portion of the field of view 256a-256b of the lens 112d to the right of the line 272 may provide a view of behind the ego vehicle (e.g., on the passenger side). In an example, the portion of the field of view 256a-256b of the lens 112d to the left of the line 272 may be obstructed by the ego vehicle 50.

The field of view 252a-252b of the lens 112c may overlap portions of the field of view 254a-254b of the lens 112g and overlap portions of the field of view 256a-256b of the lens 112d. In an example, video frames generated from the pixel data corresponding to the field of view 252a-252b may provide a view of behind the ego vehicle 50 to the right of the reference line 272 (e.g., overlapping with the field of view 256a-256b) and a view behind the ego vehicle 50 to the left of the reference line 270 (e.g., overlapping with the field of view 254a-254b).

The field of view 252a-252b of the lens 112c may provide coverage of areas behind the ego vehicle 50 that are not visible in the field of view 254a-254b of the lens 112g or the field of view 256a-256b of the lens 112d. In an example, video frames generated from the pixel data corresponding to the field of view 252a-252b may provide a view of behind the ego vehicle 50 to the left of the reference line 272 (e.g., the obstructed portion of the field of view 256a-256b) and a view behind the ego vehicle 50 to the right of the reference line 270 (e.g., the obstructed portion of the field of view 254a-254b). For example, an object to the left of the reference line 272 may be visible in the field of view 252a-252b but may not be visible in the field of view 256a-256b.

The capture device 102c, the capture device 102d and/or the capture device 102g may be configured to implement a three-camera electronic mirror system. The capture device 102c may be configured to capture pixel data behind the ego vehicle 50 from a rear end of the ego vehicle 50. The capture device 102d may be configured to capture pixel data behind the ego vehicle 50 from a passenger side mirror of the ego vehicle 50. The capture device 102g may be configured to capture pixel data behind the ego vehicle 50 from a driver side mirror of the ego vehicle 50. Video frames from each of the three capture devices 102c, 102d and 102g may be presented to one or more of the displays 118a-118n.

In some embodiments, the processors 106a-106n may be configured to perform video stitching operations and/or de-warping operations to form video frames that combine more than one of the fields of view of the capture devices 102a-102n (e.g., a 360 degree field of view). In some embodiments, the processors 106a-106n may be configured to analyze the video data captured by each of the capture devices 102a-102n and aggregate the results to make inferences about all the video data (e.g., the video data from each field of view may be analyzed individually, and the results may be combined to effectively create a 360 degree field of view, even if a single video stream of all 360 degrees around the ego vehicle 50 is never actually created).

Figure 4:
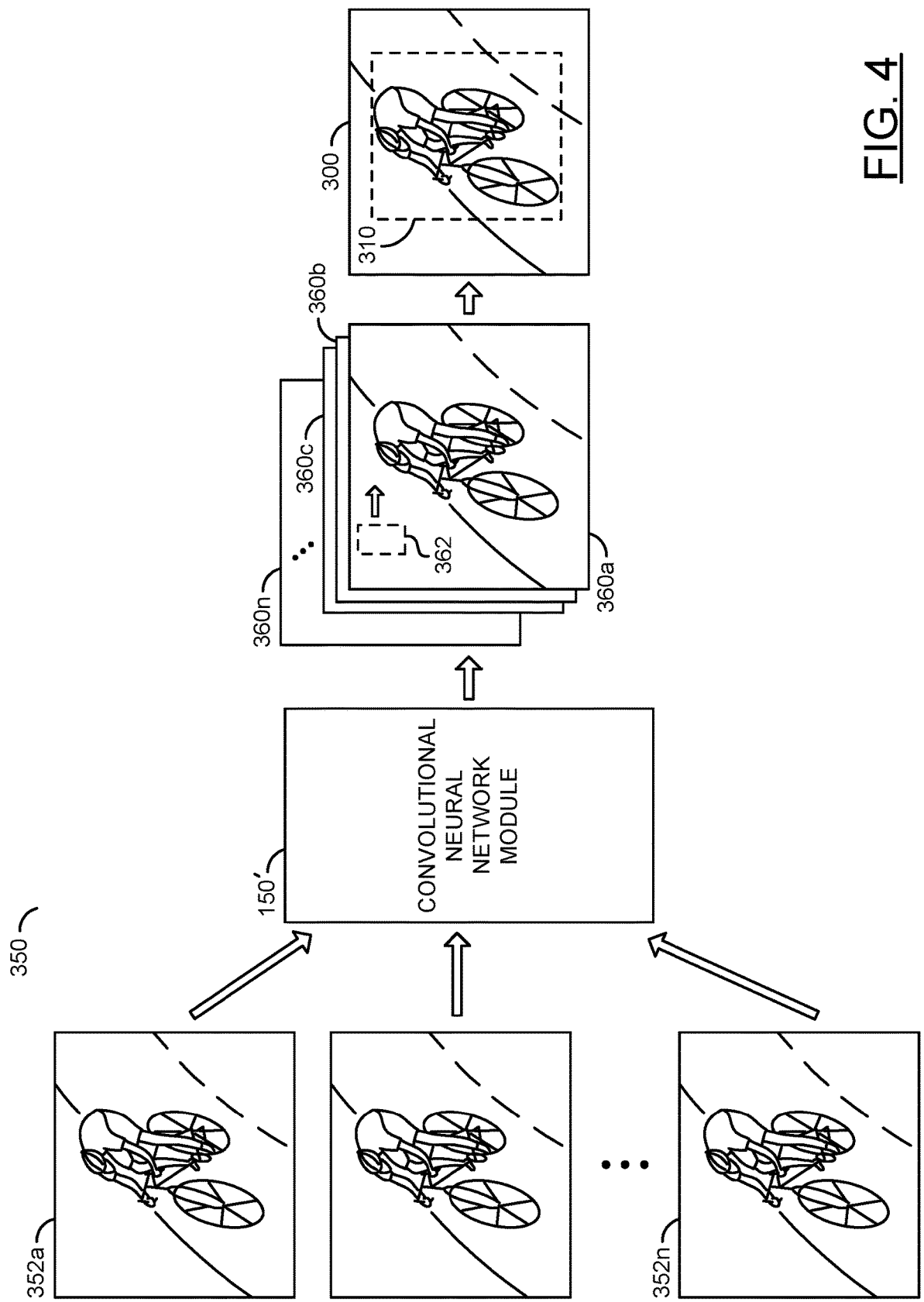
FIG. 4 is a diagram illustrating an example visualization of training a convolutional neural network for object detection using fleet learning.

Referring to FIG. 4, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n (e.g., a machine learning model) may be pre-programmed and/or loaded into the processors 106a-106n. The processors 106a-106n may conduct inferences against the machine learning model (e.g., to perform object detection). In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture video data of a cyclist (e.g., captured from a rear camera of the ego vehicle 50). For example, the training data 352a-352n may be a sequence of video frames captured showing a cyclist (or other object) approaching the ego vehicle 50 from behind. The training data 352a-352n may be labeled based on whether the detection of the object was incorrect or correct. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In yet another example, different drivers (e.g., different people) talking while holding various models of smartphones may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

In some embodiments, the machine learning may be performed by the centralized CNN module 150'. Generally, the processing capabilities and/or computing resources available to the centralized CNN module 150' (e.g., implemented as part of a cloud computing network) may be greater than the processing capabilities and/or computing resources available to the CNN module 150 implemented by the processors 106a-106n. For example, the centralized CNN module 150' may perform the machine learning using the training data 352a-352n, develop a machine learning model, and then provide the machine learning model to each apparatus 100. The CNN module 150' may continue to receive the training data 352a-352n from each apparatus 100, refine the machine learning model, and then provide updates to the machine learning model for each apparatus 100. The centralized CNN module 150' may develop and/or refine the machine learning model by receiving input (e.g., the training data 352a-352n) from multiple sources (e.g., each vehicle that implements the apparatus 100).

In some embodiments, the machine learning may be performed by the CNN module 150 implemented by the processors 106a-106n. For example, the processors 106a-106n and/or the apparatus 100 may be an edge device, and the CNN module 150 may implement the machine learning model adapted to the constraints of the edge device. The processors 106a-106n may be configured to compress the machine learning model (e.g., compressed compared to the machine learning model implemented by the centralized CNN module 150'). In an example, compressing the machine learning model may comprise quantization, pruning, sparsification, etc. Compressing the machine learning model may enable the CNN module 150 to perform the machine learning and/or conduct inferences against the machine learning model (e.g., object detection). By performing the machine learning at the edge (e.g., locally on the processors 106a-106n), there may be reduced latency compared to performing wireless communication with the centralized CNN module 150'. Similarly, the apparatus 100 may be able to perform the machine learning without maintaining a wireless connection. By performing the machine learning at the edge, privacy may be maintained since the training data 352a-352n would be kept local. Whether the machine learning is performed locally (e.g., at the edge), performed using a centralized resource and/or performed using a combination of local and centralized resources may be varied according to the design criteria of a particular implementation.

Figure 5:
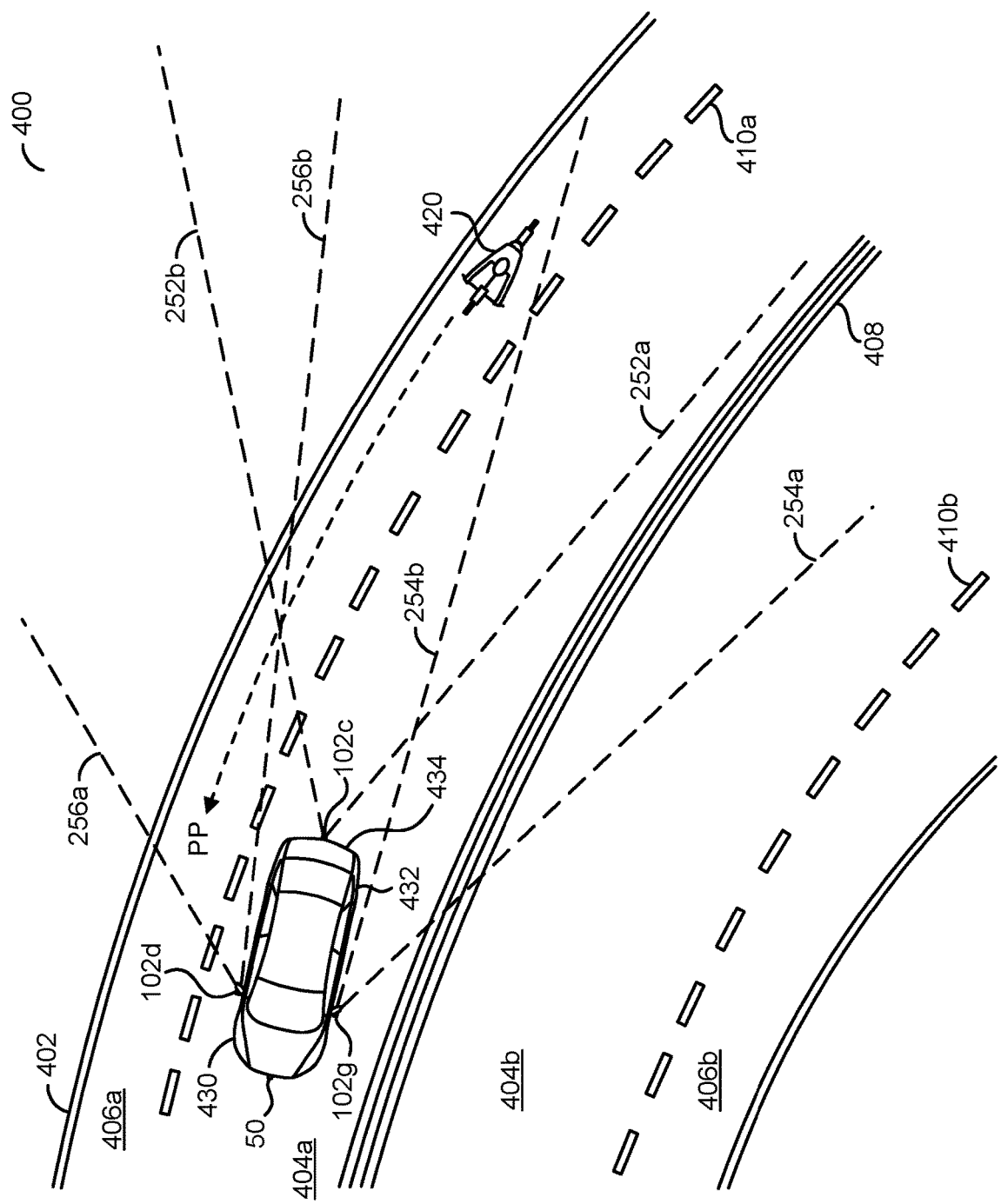
FIG. 5 is a diagram illustrating an example curved road scenario.

Referring to FIG. 5, a diagram illustrating an example curved road scenario is shown. An example scenario 400 is shown. The example scenario 400 may comprise a roadway 402. The roadway 402 may comprise car lanes 404a-404b and bike lanes 406a-406b. Center lines 408 are shown on the roadway 402. The center lines 408 may separate the car lane 404a from the car lane 404b (e.g., provide markers for drivers to avoid oncoming traffic). Lane lines 410a-410 are shown on the roadway 402. The lane line 410a may separate the car lane 404a from the bike lane 406a. The lane line 410b may separate the car lane 404b from the bike lane 406b.

The ego vehicle 50 is shown on the roadway 402. In the example scenario 400, the ego vehicle 50 may be driving in the car lane 404a. A cyclist 420 is shown riding in the bike lane 406a. For illustrative purposes of the example scenario 400, only the ego vehicle 50 and the cyclist 420 are shown on the roadway 402. Embodiments of the apparatus 100 may be configured to provide functionality with any number of other vehicles, road types, pedestrians, other obstacles, etc.

The roadway 402 is shown having a curve. The roadway 402 is shown curving to the left with respect to the direction of travel of the ego vehicle 50.

The capture device 102d is shown mounted on a side 430 of the ego vehicle 50. In an example, the side 430 may be the passenger side of the ego vehicle 50. The passenger side 430 may be the side of the ego vehicle 50 that faces the bike lane 406a. The field of view 256a-256b of the capture device 102d is shown. In the example shown, the field of view 256a-256b may capture a partial view of the bike lane 406a. Because of the curve of the roadway 402, the field of view 256a-256b may capture a small portion of the bike lane 406a and an area off the roadway 402. For example, if the roadway 402 was straight, the field of view 256a-256b may capture more of the roadway 402 (e.g., more of the bike lane 406a). The processors 106a-106n may generate video frames showing the rear passenger side view based on the field of view 256a-256b.

The capture device 102g is shown mounted on a side 432 of the ego vehicle 50. In an example, the side 432 may be the driver side of the ego vehicle 50. The driver side 432 may be the side of the ego vehicle 50 that faces the oncoming car lane 404b. The field of view 254a-254b of the capture device 102g is shown. In the example shown, the field of view 254a-254b may capture a partial view of the oncoming car lane 404b and a partial view of the car lane 404a. Because of the curve of the roadway 402, the field of view 254a-254b may capture a small portion of the bike lane 406a along with the car lines 404a-404b. For example, if the roadway 402 was straight, the field of view 254a-254b may not capture the bike lane 406a. The processors 106a-106n may generate video frames showing the rear driver side view based on the field of view 254a-254b.

The capture device 102c is shown mounted on a side 434 of the ego vehicle 50. In an example, the side 434 may be the rear end of the ego vehicle 50. The field of view 252a-252b of the capture device 102c is shown. In the example shown, the field of view 252a-252b may capture a partial view of the car lane 404a behind the ego vehicle 50 and a partial view of the bike lane 406a. Because of the curve of the roadway 402, the field of view 252a-252b may capture more of the bike lane 406a than the field of view 256a-256b. The processors 106a-106n may generate video frames showing the rear view based on the field of view 252a-252b.

In the example scenario 400, the cyclist 420 is shown within the field of view 252a-252b (e.g., captured by the capture device 102c) but the cyclist 420 may not be within the field of view 256a-256b. For example, the cyclist 420 may be to the left of the reference line 272 shown in association with FIG. 3. The ego vehicle 50 may cause on obstruction of the field of view 256a-256b that prevents the cyclist 420 from being captured by the capture device 102d. Since the cyclist 420 may not be captured in the pixel data of the video frames generated from the capture device 102d, the computer vision operations may not be able to detect the cyclist 420 using the video frames generated from pixel data captured by the capture device 102d. For example, if a collision warning system for the passenger side 430 relies on object detection performed on video frames generated by the capture device 102d, then the cyclist 420 would not be detected until the cyclist 420 is close enough to the ego vehicle 50 to be within the field of view 256a-256b.

The cyclist 420 may be an example of a moving object. A dotted arrow (e.g., PP) is shown. The dotted arrow PP may represent a path of the cyclist 420. In the example scenario 400, the cyclist 420 may be currently located behind the ego vehicle 50 (e.g., directly in line with the rear end 434). However, the cyclist 420 may be moving (e.g., traveling at speed) following the path PP in the bike lane 406a. If the cyclist 420 travels faster than the ego vehicle 50 (e.g., the ego vehicle 50 is parked, or waiting at a stop light), the cyclist 420 may approach the ego vehicle 50 along the path PP.

An approach side of the ego vehicle 50 may be a side of the ego vehicle 50 that a moving object may eventually pass and/or be alongside. The moving object 420 may currently be located on a current side of the ego vehicle 50, and because of the curve of the road 402 end up moving alongside a different side of the ego vehicle to (e.g., the approach side). In the example scenario 400, the current side of the ego vehicle 50 for the cyclist 420 may be the rear end side 434. The path PP may indicate that the cyclist 420 may travel alongside the passenger side 430. As the cyclist 420 approaches the ego vehicle 50, the curve of the road may result in the cyclist 420 riding alongside the passenger side 430 of the ego vehicle 50. For example, the approach side of the ego vehicle 50 with respect to the cyclist 420 may be the passenger side 430. Since the cyclist 420 may not be in the field of view 256a-256b until the cyclist 420 gets closer to the ego vehicle 50, the cyclist 420 may not be visible on the approach side 430 (e.g., not visible in video frames generated from the pixel data captured by the capture device 102*d*) with sufficient time for the driver 202 to react to the presence of the cyclist 420.

The approach side of the ego vehicle 50 may depend on various factors. The approach side of the ego vehicle 50 may depend on the direction of travel of the ego vehicle 50, the shape of the roadway 402, rules and regulations (e.g., which side of the road vehicles drive on), the presence of bike lanes, the path of the moving object, etc. In the example shown, the approach side may be the passenger side 430. In another example, if the cyclist 420 were to attempt to pass the ego vehicle 50 on the driver side 432, then the approach side may be the driver side 432. The approach side of the moving object 420 may be dependent upon the path PP of the moving object 420.

The processors 106*a*-106*n* may be configured to determine the path PP of the moving object 420. The path PP determined by the processors 106*a*-106*n* may be the predicted path. The predicted path PP may be determined based on the current location, speed, and/or direction of travel of the moving object (e.g., a trajectory) 420 and/or the shape of the roadway 402. The decision module 158 may determine where the moving object 420 may eventually move to with respect to the orientation of the ego vehicle 50. Since the moving object 420 may not currently be visible in the field of view 256*a*-256*b* of the capture device 102*d* (e.g., the capture device located on the approach side 430), the processors 106*a*-106*n* may detect the moving object 420 based on video frames generated from the capture device 102*c* (e.g., a capture device that may be located on the rear side 434 and not located on the approach side 430). The processors 106*a*-106*n* may detect the current location of the moving object 420 using video frames from the capture device 102*c* (e.g., a capture device that is not on the approach side 430). By using the video frames that show the field of view 252*a*-252*b*, the moving object 420 and the predicted path PP may be determined before the moving object 420 is in the field of view 256*a*-256*b*. The processors 106*a*-106*n* may generate a notification (e.g., to warn the driver 202 about the moving object 420) before the moving object 420 is visible in video frames that show the field of view 256*a*-256*b* (e.g., the video frames generated from the capture device 102*d* on the approach side 430 of the ego vehicle 50).

The processors 106*a*-106*n* may be configured to detect events. In some embodiments, the event may be information that warrants being brought to the attention of the driver 202. In some embodiments, the event may be information about moving objects approaching the ego vehicle 50. In some embodiments, the event may be a detected scenario that the apparatus 100 should react to (e.g., avoid collisions, provide warnings, store information, avoid roadway hazards, etc.). For example, whether a detected scenario is considered an event may be determined by the decision module 158. In one example, the event may correspond to detecting that a moving object (e.g., a vehicle, a pedestrian, a cyclist, an animal, etc.) may be approaching the ego vehicle 50 from behind along a curve such that the moving object might not be visible to the driver 202 in a particular view while the moving object is detected in another view. The events may be detected based on the computer vision operations performed on the video data captured using the capture devices 102*a*-102*n*. The events may be detected based on readings from the sensors 114*a*-114*n*. For example, the sensor fusion module 152 may be configured to combine information determined using the computer vision operations and information detected using the sensors 114*a*-114*n* to make inferences that may be used by the decision module 158. The events may be detected by predicting future locations of objects based on a current location of the objects.

The processors 106*a*-106*n* may generate the signal VCTRL in response to detecting an event. For example, the signal VCTRL may be generated when the moving object 420 is predicted to move towards the approach side 430 of the ego vehicle 50. When no event is detected, the processors 106*a*-106*n* may not generate the signal VCTRL.

In some embodiments, the processors 106*a*-106*n* may be configured to generate a notification as a response to the detected (or predicted) event. For example, when the decision module 158 determines that an event has been detected the processors 106*a*-106*n* may generate the notification as part of (or alongside) one or more of the signals VOUT_A-VOUT_N (e.g., as a visual indicator on the displays 118*a*-118*n*). In some embodiments, the notification may be an audio output by the actuators 116 (e.g., a speaker). The type of notification generated may be varied according to the design criteria of a particular implementation.

Figure 6:
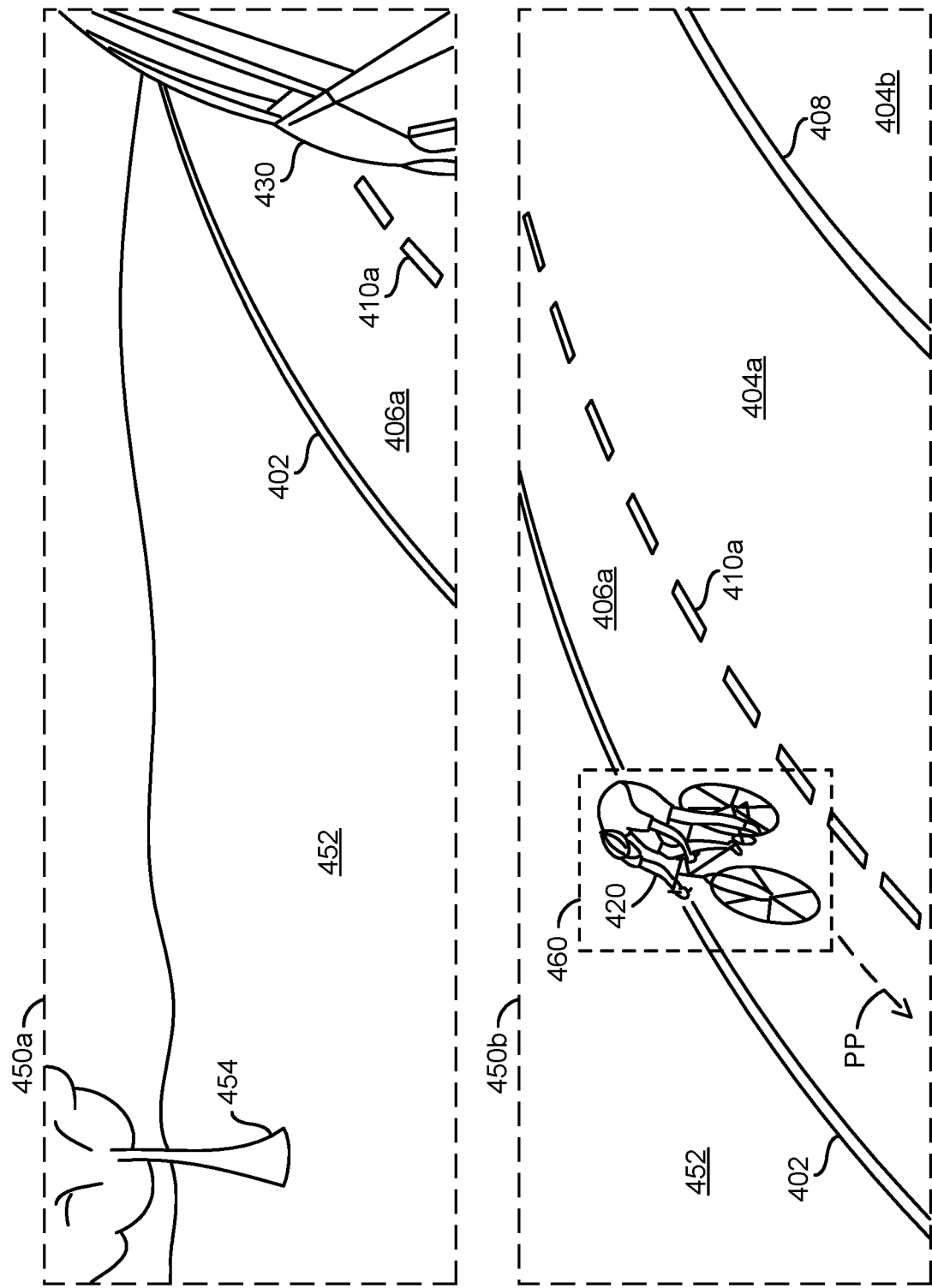
FIG. 6 is a diagram illustrating an example side view video frame and an example rear view video frame.

Referring to FIG. 6, a diagram illustrating an example side view video frame and an example rear view video frame is shown. Example video frames 450*a*-450*b* are shown. The example video frames 450*a*-450*b* may be video frames generated from pixel data captured at approximately the same time from two of the capture devices 102*a*-102*n*. The example video frame 450*a* may be a video frame generated from pixel data captured by the capture device 102*d* (e.g., a view from the passenger side 430 of the ego vehicle 50) and the example video frame 450*b* may be a video frame generated from pixel data captured by the capture device 102*c* (e.g., a view of behind the ego vehicle 50).

In one example, the video frames 450*a*-450*b* may be provided to the processor 106*a*-106*n* as the signal FRAMES_A-FRAMES_N. In another example, the video frames 450*a*-450*b* may be generated by the processors 106*a*-106*n* in response to the pixel data provided in the signal FRAMES_A-FRAMES_N. The pixel data may be received by the processors 106*a*-106*n* and video processing operations may be performed by the video processing pipeline 156 to generate the example video frames 450*a*-450*b*. In some embodiments, the example video frames 450*a*-450*b* may be presented as human viewable video data output to one or more of the displays 118*a*-118*n*. In some embodiments, the example video frames 450*a*-450*b* may be utilized internal to the processor 106*a*-106*n* to perform the computer vision operations.

The example video frame 450*a* may comprise pixel data corresponding to the field of view 256*a*-256*b* captured by the capture device 102*d*. The video frame 450*a* may comprise the road 402, the bike lane 406*a*, the lane line 410*a* and the approach side 430 of the ego vehicle 50. The video frame 450*a* may further comprise an off-road area 452 and a tree 454. The tree 454 may be in the off-road area 452.

The road 402 in the example video frame 450*a* may be curved (e.g., a left curve similar to the example shown in association with FIG. 5). Because of the curve of the road 402, the area exterior to the ego vehicle 50 within the field of view 256*a*-256*b* may not provide a view of the road 402 directly behind the ego vehicle 50 (e.g., the off-road area 452 is visible instead). A portion of the bike lane 406*a* may be obstructed from view by the ego vehicle 50. For example, the portion of the bike lane 406*a* that is not visible in the example video frame 450*a* may be to the left of the reference line 272 shown in association with FIG. 3. Since the road 402 is curved, the video frame 450a may not provide a view of objects on the road 402 that may be located behind the ego vehicle 50.

The example video frame 450b may comprise pixel data corresponding to the field of view 252a-252b captured by the capture device 102c. The video frame 450b may comprise the road 402, the car lane 404a, the car lane 404b, the bike lane 406a, the center line 408, the lane line 410a, the cyclist 420 and the off road area 452. Since the capture device 102c may be mounted on a rear end of the ego vehicle 50, the video frame 450b may not show the ego vehicle 50. The example video frame 450b may provide a view directly behind the ego vehicle 50.

A dotted box 460 is shown. The dotted box 460 may represent the moving object 420 detected in response to the computer vision operations. The dotted box 460 may be a bounding box that represents a size and/or location of the moving object 420 in the video frame 450b. In the example shown, the moving object 420 may be a cyclist. In another example, the moving object 420 may be a motorcycle. In yet another example, the moving object 420 may be a pedestrian. In still another example, the moving object 420 may be another vehicle. The type of object detected by the processors 106a-106n may be varied according to the design criteria of a particular implementation.

The detected object 460 may be detected in the example video frame 450b, but may not be visible in the example video frame 450a. In the example shown, if notifications are dependent on detecting objects based on the video frame 450a (e.g., the capture device 102d mounted on the passenger side 430 of the ego vehicle 50) then no notification would be generated. The processors 106a-106n may be configured to use the detection of the object 460 from the video frame 450b captured by one capture device (e.g., the rear capture device 102c) to predict the presence of the moving object 420 on the approach side 430 of the ego vehicle 50 (e.g., the detected object 460 may eventually be captured by another capture device (e.g., the passenger side capture device 102d) in a future video frame with the same field of view as the video frame 450a).

The decision module 158 may predict the presence of the moving object 420 in response to determining the predicted path PP. The predicted path PP may be calculated in response to the computer vision operations performed on the detected object 460. The computer vision operations may comprise detecting the object 460 and/or analyzing the movement of the detected object 460 over a sequence of video frames. In the example shown, one video frame 450b may provide a single data point about the detected object 460. Additional video frames captured by the capture device 102c that provide a similar view as the video frame 450b may provide additional data points about the detected object 460.

The computer vision operations may detect changes in a relative position of the detected object 460 in the video frame 450b (e.g., an X,Y pixel location, a pixel location relative to the edges of the video frame 450b, a size of the detected object, etc.). The changes in relative position of the detected object 460 over a sequence of video frames may be used to determine an absolute speed of the detected object 460, a speed of the detected object 460 relative to the ego vehicle 50 and/or a direction of travel of the detected object 460 (e.g., the trajectory of the detected object 460). The speed and/or direction of the detected object 460 may be compared to the speed and/or direction of the ego vehicle 50 and/or the shape of the road 402 to determine the predicted path PP.

In some embodiments, a change in size of the detected object 460 (e.g., a change in proportion of the number of pixels that comprise the detected object 460 compared to the total number of pixels in the video frame 450b) may indicate a change in distance of the detected object 460 from the ego vehicle 50. In an example, the cyclist 420 may appear larger in the video frame 450b as the cyclist 420 moves closer to the ego vehicle 50 (e.g., the detected object 460 may be represented by 25% of the total number of pixels in the video frame 450b). In another example, the cyclist 420 may appear smaller in the video frame 450b as the cyclist 420 moves farther away from the ego vehicle 50 (e.g., the detected object 460 may be represented by 5% of the total number of pixels in the video frame 450b).

In some embodiments, a change in location of the detected object 460 (e.g., a change in an X,Y coordinate of the detected object 460 within the video frame 450b) may indicate a direction of travel of the detected object 460. In an example, in an earlier video frame in a sequence of video frames, the bounding box 460 representing the cyclist 420 may have a top right corner located at pixel location 2000, 4000 (e.g., generally at a top middle area of a 4K video frame). If the location of the bounding box 460 in a later video frame in the sequence of video frames is located at a pixel location 700, 2000 (e.g., generally on a left area of a 4K video frame), then the processors 106a-106n may determine that the cyclist 420 has moved closer to the passenger side 430 of the ego vehicle 50. The cyclist 420 may eventually move out of frame (e.g., no longer appear in the video frame 450b) as the cyclist 420 moves closer to the ego vehicle 50 (e.g., starts to appear only in the video frame 450a).

In some embodiments, the shape of the road 402 and/or characteristics of the road 402 may be used to determine the predicted path PP. The decision module 158 may rely on assumptions to determine the predicted path PP. In an example, the lane markers 410a may be used to detect the bike lane 406a. The detected object 460 may be classified as a cyclist by the CNN module 150. The presence of the bike lane 406a may be used as an assumption about where the cyclist 420 may likely travel. For example, the assumption by the decision module 158 may be that the cyclist 420 may continue to travel in the bike lane 406a and the predicted path PP may be on the passenger side 430 of the ego vehicle 50 instead of the driver side 432. Furthermore, the decision module 158 may use the assumption that the cyclist 420 may follow the curved shape of the road 402. Since the road 402 has a curved shape, the processors 106a-106n may determine that the cyclist 420 may move from directly behind the ego vehicle 50 to alongside the passenger side 430.

The processors 106a-106n may take into account the shape of the road 402 when analyzing other factors. In one example, when determining the pixel location of the detected object 460, the shape of the road 402 may affect where the detected object 460 is located in the video frames 450a-450b. For example, if the road 402 has a decline behind the ego vehicle 50, the bounding box 460 of the cyclist 420 may appear to move upwards in the video frame 450b, but the direction of travel of the cyclist 420 may not have changed. A bank in the road 402 may also make the location of the bounding box 460 change even though the direction and/or speed of the cyclist 420 has not changed. The processors 106a-106n may offset measurements of the speed and/or direction of the moving object 460 in response to the shape of the roadway 402.

The processors 106a-106n may be configured to aggregate the various data points (e.g., relative speed, direction of travel, shape of the road 402, characteristics of the road 402, etc.) about the detected object 460 to determine the predicted path PP. The processors 106a-106n may be configured to compare the predicted path PP with the orientation and/or path of the ego vehicle 50. In response to the predicted path PP of the moving object 420 and the orientation and/or path of the ego vehicle 50, the processors 106a-106n may determine the approach side of the ego vehicle 50.

In the example shown, the moving object 420 may be detected and located within the bounding box 460. The CNN module 150 may classify the moving object 420 as a cyclist. The processors 106a-106n may determine that the cyclist 420 is within the bike lane 406a (e.g., on the left side of the lane marker 410a). The location of the bounding box 460 may be on the left side of the video frame 450b. Since the field of view 252a-252b may be a view looking out from the rear of the ego vehicle 50, the left side of the video frame 450b may correspond to the passenger side 430 of the ego vehicle 50. Over a sequence of video frames, the cyclist 420 may be determined to move further to the left of the video frame 450b and increase in size. Based on the aggregated data (e.g., moving to the left side of the video frame 450b, increasing in size over time, a cyclist riding in the bike lane 406a, etc.), the processors 106a-106n may determine the predicted path PP of the cyclist 420. The predicted path PP may follow the bike lane 406a along the curve of the road 402. The predicted path PP may be alongside the passenger side 430 of the ego vehicle 50. Based on the predicted path PP, the decision module 158 may determine that the approach side of the moving object 420 may be the passenger side 430.

In the example shown, the approach side 430 of the ego vehicle 50 may be shown in the example video frame 450a captured by the capture device 102d. Since the road 402 is curved, even though the cyclist 420 may be riding in the bike lane 406a that is located on the passenger side 430 of the ego vehicle 50, the section of the bike lane 406a that the cyclist 420 is currently riding in may be directly behind the ego vehicle 50. The predicted path PP of the cyclist 420 may lead to the approach side 430 visible in the video frame 450a. However, the cyclist 420 may not be currently visible in the video frame 450a. When the cyclist 420 gets closer (e.g., approaches) the ego vehicle 50, the cyclist 420 may appear in the video frame 450a (e.g., captured at a later time than the example shown). However, when the cyclist 420 is visible in the video frame 450a, there may not be sufficient time for the driver 202 to react to the presence of the cyclist 420.

In response to the detection of the cyclist 420 in the video frame 450b generated by the capture device 102c, the predicted path PP and/or the path and/or orientation of the ego vehicle 50, the processors 106a-106n may generate the notification about the cyclist 420 before the cyclist 420 appears in the video frame 450a. The processors 106a-106n may generate the signal VCTRL to provide the notification. In an example, if the ego vehicle 50 slows down or stops, the cyclist 420 may catch up to the ego vehicle 50 and/or pass the ego vehicle 50 on the approach side 430. The notification generated by the processors 106a-106n may provide an early warning that the cyclist 420 is approaching the ego vehicle 50 on the approach side 430 before the cyclist 420 is visible in the video frames generated by the capture device 102d.

In some embodiments, the processors 106a-106n may detect the moving object 420, determine the predicted path PP and determine the approach side of the ego vehicle 50 but suppress the notification. The notification may be an annoyance to the driver 202 if the moving object 420 does not move close enough to the ego vehicle 50. In an example, the ego vehicle 50 (e.g., a car) may generally move faster than the cyclist 420. If the ego vehicle 50 is pulling farther away from the cyclist 420 (e.g., the size of the cyclist appears smaller over the sequence of video frame), then the notification may be suppressed. Since the cyclist 420 may not reach the approach side of the ego vehicle 50, the decision module 158 may determine that no event has occurred. When the event is not determined to have occurred, then the notification may be suppressed. However, if the orientation, path and/or speed of the ego vehicle 50 changes, the decision module 158 may then determine that the event has occurred. For example, the ego vehicle 50 may stop or slow down or make a right hand turn, which may result in the cyclist 420 moving close to the ego vehicle 50. When the cyclist 420 moves close enough to the ego vehicle 50, then the processors 106a-106n may generate the notification.

The moving object 420 may be determined to be close enough to be considered an event when the moving object 420 is closing in on the ego vehicle 50 (e.g., moving closer). The distance that the moving object 420 may be considered an event may be determined based on the relative speed of the moving object 420 compared to the ego vehicle 50 (e.g., if the cyclist 420 is moving very fast, the notification may be provided when the cyclist 420 is farther away from the ego vehicle 50 compared to if the cyclist 420 is moving slowly). The notification may be generated when the moving object 420 is far enough away to provide an advanced warning (e.g., before the moving object 420 is visible in the video frame 450a), but not so far away that the notification does not provide an indication that the cyclist 420 is actually approaching the ego vehicle 50. The distance from the ego vehicle 50 that the detection of the moving object 420 may result in generating the notification may be varied according to the design criteria of a particular implementation.

Figure 7:
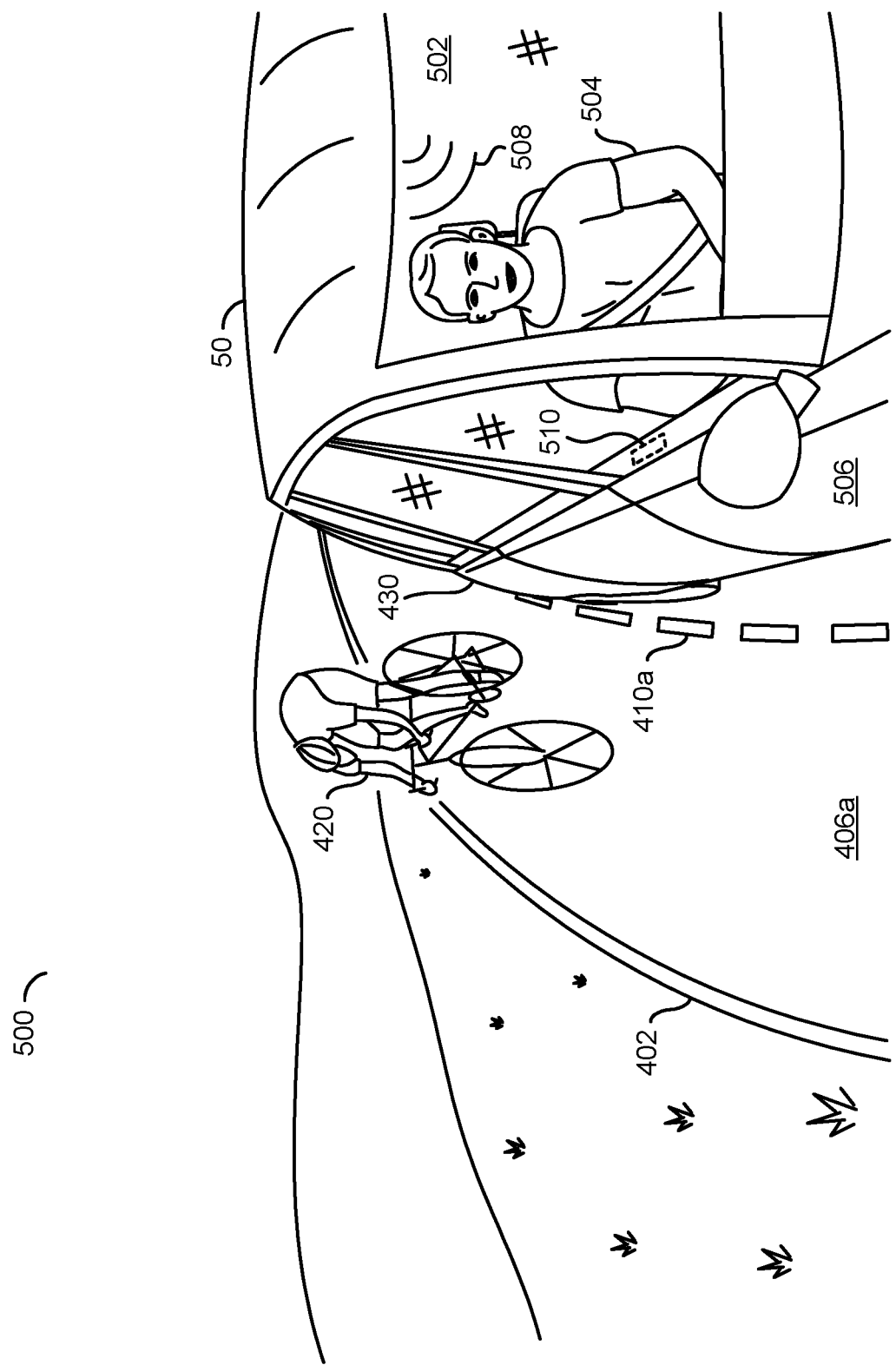
FIG. 7 is a diagram illustrating an example of preventing an accident with an oncoming cyclist.

Referring to FIG. 7, a diagram illustrating an example of preventing an accident with an oncoming cyclist is shown. A view of an example scenario 500 is shown. The example scenario 500 may comprise the ego vehicle 50, the curved road 402 and/or the cyclist 420. The ego vehicle 50 may be driving in the car lane 404a. The passenger side 430 of the ego vehicle 50 is shown next to the bike lane 406a. The cyclist 420 is shown riding within the bike lane 406a (e.g., between the lane marker 410a and the side of the road 402).

In the example scenario 500 shown, the cyclist 420 may be about to pass the ego vehicle 50 on the approach side 430. In an example, the ego vehicle 50 may be parked. An interior 502 of the ego vehicle 50 is shown. A passenger 504 is shown in the interior 502. In the example scenario 500, the passenger 504 may be about to open a passenger door 506 of the ego vehicle 50. The passenger door 506 may be one of the car doors on the approach side 430 of the ego vehicle 50.

Opening the passenger door 506 may cause the passenger door 506 to swing open into the bike lane 406a. Since the ego vehicle 50 may not be moving and the cyclist 420 may be passing along the approach side 430 in the bike lane 406a, if the passenger door 506 is opened there may be a collision between the cyclist 420 and the opened passenger door 506. Car doors injuring cyclists is a common occurrence. Even when cyclists are visible in side view mirrors, vehicle occupants often do not think to check for cyclists and swing open the door.

The processors 106a-106n may have already detected the cyclist 420 in the video frames captured by the capture device 102c before the scene shown in the example scenario 500. For example, the processors 106a-106n may have detected the moving object 420, classified the moving object 420 as a cyclist, determined the predicted path PP of the cyclist 420 in the bike lane 406a and/or determine that the passenger side 430 may be the approach side of the ego vehicle 50 for the cyclist 420. Based on the predicted path PP of the moving object 420 and/or the relative speed between the ego vehicle 50 the processors 106a-106n may enable the notification.

The notification may be generated to warn the occupant 504 to prevent the door 506 from being opened when the cyclist 420 is approaching and/or passing the ego vehicle 50. In one example, curved lines 508 may represent an audio notification. The audio notification 508 may be generated by speakers (e.g., one of the actuators 116). The audio notification 508 may implement an audio warning. For example, the audio notification 508 may warn the passenger 508 not to open the car door 506. In an example, the audio notification 508 may playback a voice recording (e.g., "Incoming bicycle, do not open the door"). The type of audio notification 508 may be varied according to the design criteria of a particular implementation.

In some embodiments, the notification may comprise a control signal. A dotted box 510 is shown. The dotted box 510 may be part of the door panel of the car door 506. The dotted box 570 may represent an electronic lock control for the car door 506. The control signal generated with the notification may be configured to adjust the electronic lock control 510. In an example, the signal VCTRL may be generated to cause the electronic lock control 510 to lock the car door 506 when the cyclist 420 is near the approach side of the ego vehicle 50. By automatically locking the car door 506, the processors 106a-106n may prevent the passenger 504 from accidentally hitting the cyclist 420 when opening the car door 506. In another example, the signal VCTRL may be generated to cause the electronic lock control 510 to unlock the car door 506 when the cyclist 420 has moved past the ego vehicle 50. By automatically unlocking the car door 506, the processors 106a-106n may enable the passenger 504 to open the car door 506 when the moving object is no longer in the path of the open car door 506.

In some embodiments, the processors 106a-106n may be configured to generate the audio warning 508 and/or adjust the electronic lock control 510 to lock the car door 506 in response to the computer vision operations performed on the video frames generated from the capture device 102d. For example, if the cyclist 420 is present in the video frame 450a, the processors 106a-106n may generate the signal VCTRL to lock the door 506. In some embodiments, the processors 106a-106n may be configured to generate the audio warning 508 and/or adjust the electronic lock control 510 to lock the car door 506 in response to detections made by the sensors 114. In an example, one of the sensors 114 may be a proximity sensor (e.g., a radar sensor) configured to detect the presence of movement on the passenger side 430. For example, if the movement of the cyclist 420 is detected by the radar sensor 114, then the processors 106a-106n may generate the signal VCTRL to lock the door 506.

The apparatus 100 may be configured to provide an earlier warning of the presence of the cyclist 420. In some scenarios, the cyclist 420 may not appear in the video frames generated from the capture device 102d early enough to detect the cyclist 420 and generate the signal VCTRL to prevent the passenger 504 from opening the door 506. Similarly, in some scenarios, the cyclist 420 may not be detected early enough by the radar sensor 114 to generate the signal VCTRL. By detecting the cyclist 420 using results of the computer vision operations performed on video frames generated from the rear camera 102c, the response of generating the audio notification 508 and/or locking the door 506 (e.g., functionality normally performed in response to the computer vision operations performed on video frames generated from the capture device 102d alone) may be performed earlier (e.g., before the cyclist 420 is visible in the video frame 450a). For example, the apparatus 100 may be configured to use results generated from one of the capture devices 102a-102n to control functionality normally controlled by results generated from another of the capture devices 102a-102n. In some embodiments, the processors 106a-106n may be configured to monitor behavior of the occupants of the ego vehicle 50. For example, the pixel data captured by the capture device 102a may be used to generate video frames of the field of view 204a-204b showing the interior 502. Characteristics of the occupant 504 may be analyzed using the computer vision operations to determine a behavior of the occupant 504. The computer vision operations may be configured to detect movements by the occupant 504 that indicate an attempt to open the car door 506. For example, the notification 508 may not be generated unless the cyclist 420 is determined by the processors 106a-106n to be passing the approach side 430 and the processors 106a-106n determine that the occupant 504 is performing movements that indicate an attempt to open the car door 506 (e.g., when the processors 106a-106n determines that the occupant 504 has started opening the door 506).

Figure 8:
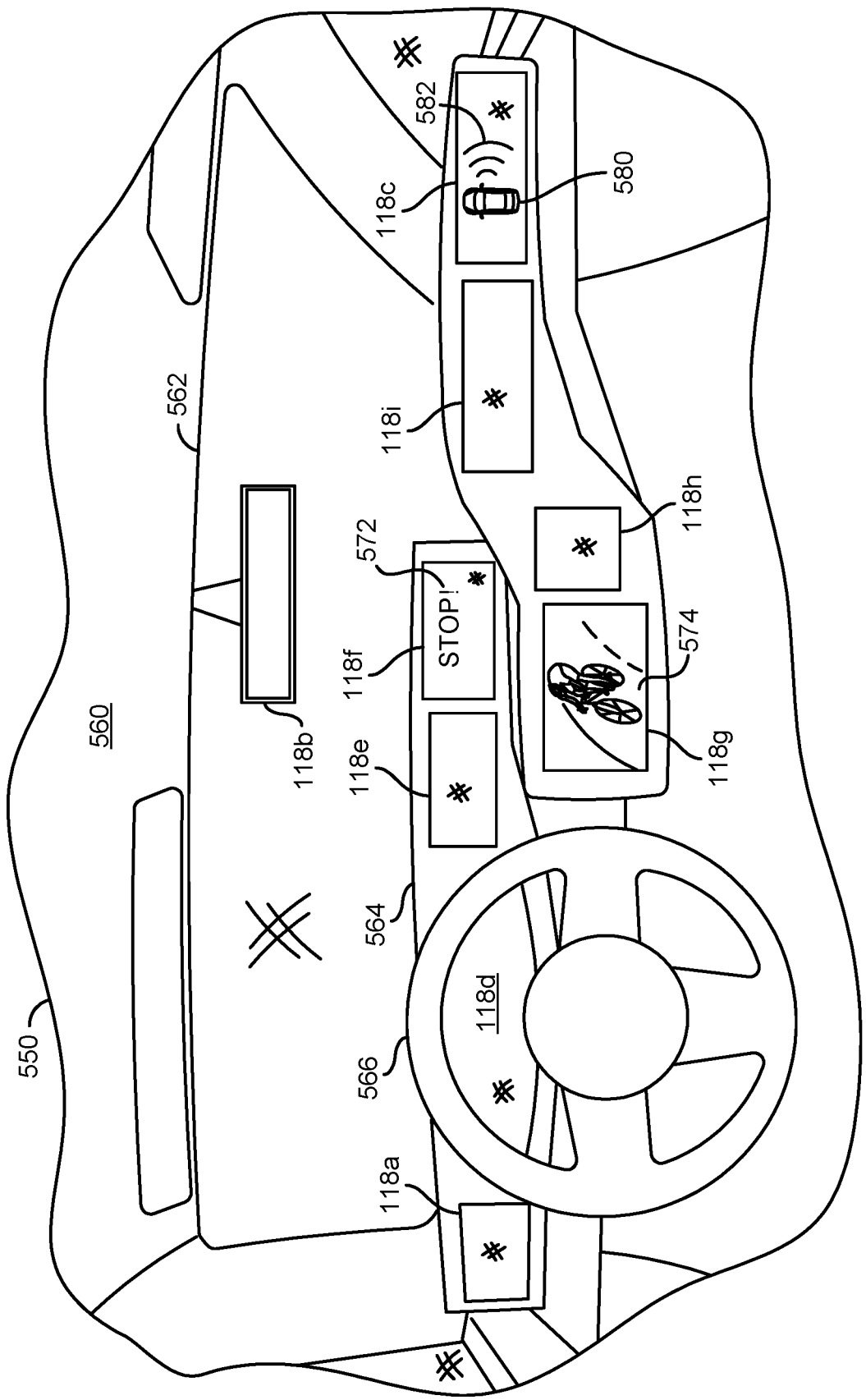
FIG. 8 is a diagram illustrating example notifications in a vehicle.

Referring to FIG. 8, a diagram illustrating example notifications in a vehicle is shown. An example interior view 550 is shown. The interior view 550 may show an interior 560 (e.g., a vehicle cabin). The interior 560 may be a representative example of the interior of the ego vehicle 50. Generally, the interior view 550 may comprise a view from a perspective of the driver 202 of the ego vehicle 50.

In the example shown, the interior 560 of the ego vehicle 50 may comprise a windshield 562, a dashboard 564, a steering wheel 566 and/or the displays 118a-118h. For example, the apparatus 100 implemented in the ego vehicle 50 may be capable of generating video output to the displays 118a-118h. In an example, one or more of the displays 118a-118n may be electronic mirrors configured to output the video data streams VOUT_A-VOUT_N generated from the pixel data captured by the capture devices 102a-102n.

In some embodiments, each of the displays 118a-118n may be configured to output the video data corresponding to one of the capture devices 102a-102n. In an example, the display 118a may be configured to output the video data stream VOUT_G generated by the capture device 102g (e.g., a view from the driver side similar to what would be seen when looking at a driver side view reflective mirror). In another example, the display 118e may be configured to output the video data stream VOUT_D generated by the capture device 102d (e.g., a view from the passenger side similar to what would be seen when looking at a passenger side view reflective mirror). In some embodiments, one or more of the displays 118a-118n may be configured to output more than one video data streams VOUT_A-VOUT_N. In an example, the display 118b may implement a 3-in-1 electronic mirror configured to display the video data stream VOUT_G generated by the capture device 102g (e.g., a driver side view), the video data stream VOUT_C generated by the capture device 102c (e.g., a rear view) and the video data stream VOUT_D generated by the capture device 102d (e.g., a passenger side view). In some embodiments, one or more of the displays may provide an infotainment system. The arrangement, the number of displays 118a-118n implemented and/or video data output on the displays 118a-118n may be varied according to the design criteria of a particular implementation.

Generally, the driver 202 may be able to focus on (e.g., look at) one of the displays 118a-118h at a time. For example, if the driver 202 is looking at the display 118e, showing the passenger side view (e.g., similar to the video frame 450a shown in association with FIG. 6), then the driver 202 may not be able to look at another one of the displays 118a-118h that shows the rear view (e.g., similar to the video frame 450b shown in association with FIG. 6) at the same time. Even if the moving object 420 is visible on one of the displays 118a-118h (e.g., a display showing the video frame 450b), the driver 202 may not notice the moving object 420. For example, when making a right turn, the driver 202 may instinctively look at the view of the passenger side (e.g., one of the displays 118a-118n showing the video frame 450a).

The processors 106a-106n may be configured to generate the notification in response to the predicted path PP of the moving object 420. The notification may provide an advanced warning of the presence of the moving object 420. For example, the moving object 420 may be currently visible on one of the displays 118a-118h that shows the rear view generated from the capture device 102c, but the moving object 420 may be approaching the ego vehicle on the approach side 430. While the moving object 420 may eventually be visible on one of the displays 118a-118n that shows the passenger side view generated from the capture device 102d, the notification may be generated before the moving object 420 is in the field of view 256a-256b of the capture device 102d. Using the camera 102c mounted on the rear side 434 of the ego vehicle 50 (e.g., the camera 102c may not be mounted on the approach side 430), the moving object 420 may be detected and the notification may be generated.

An example notification 572 is shown on the display 118f. The example notification 572 may be a text notification (e.g., a message). In the example shown, the text notification 572 may display the word "STOP!" on the display 118f. In one example, the text notification 572 may provide an instruction to the driver 202 (e.g., an instruction for avoiding a collision with the moving object 420). In another example, the text notification 572 may provide information to the driver 202 (e.g., inform the driver 202 that the cyclist 420 will be approaching on the right side).

An example notification 574 is shown on the display 118g. The example notification 574 may be an image and/or video notification. In the example shown, the video notification 574 may display a view of the cyclist 420. In some embodiments, the video notification 574 may provide a picture-in-picture view on one or more of the displays 118a-118n. In an example, the display 118g may provide the passenger side view generated by the capture device 102d (e.g., the video frame 450a) and the video notification 574 may be overlaid on the passenger side view (e.g., an image of the cyclist 420 may be shown on top of the video frame 450a to provide a warning to the driver 202).

The display 118c is shown displaying a bird's eye view 580 of the ego vehicle 50. A directional notification 582 is shown on the display 118c. The directional notification 582 may be configured to provide an indication of the approach side that the moving object 420 is approaching. In the example shown, the directional notification 582 is shown displayed on a right side of the bird's eye view 580 of the ego vehicle 50 (e.g., the passenger side). For example, since the moving object 420 may be passing the ego vehicle 50 on the passenger side 430, the directional notification 582 may be shown on the passenger side of the bird's eye view 580. If the moving object 420 was predicted by the processors 106a-106n to pass the ego vehicle 50 on the driver side 432, then the directional notification 582 may be displayed on the driver side of the bird's eye view 580 on the display 118c. The directional notification 582 may provide an advanced warning of where the moving object 420 will eventually be based on the predicted path PP.

Other types of notifications may be generated by the processors 106a-106n. In one example, the notifications may be visual. In another example, the notifications may be audio-based notifications (e.g., "Motorcycle passing on the right"). In yet another example, the notifications may be combined with control of components of the ego vehicle 50 (e.g., locking the car door 506, preventing the ego vehicle 50 from changing lanes when the moving object 420 is approaching, etc.). The type of notification generated in response to the predicted path PP of the moving object 420 may be varied according to the design criteria of a particular implementation.

Figure 9:
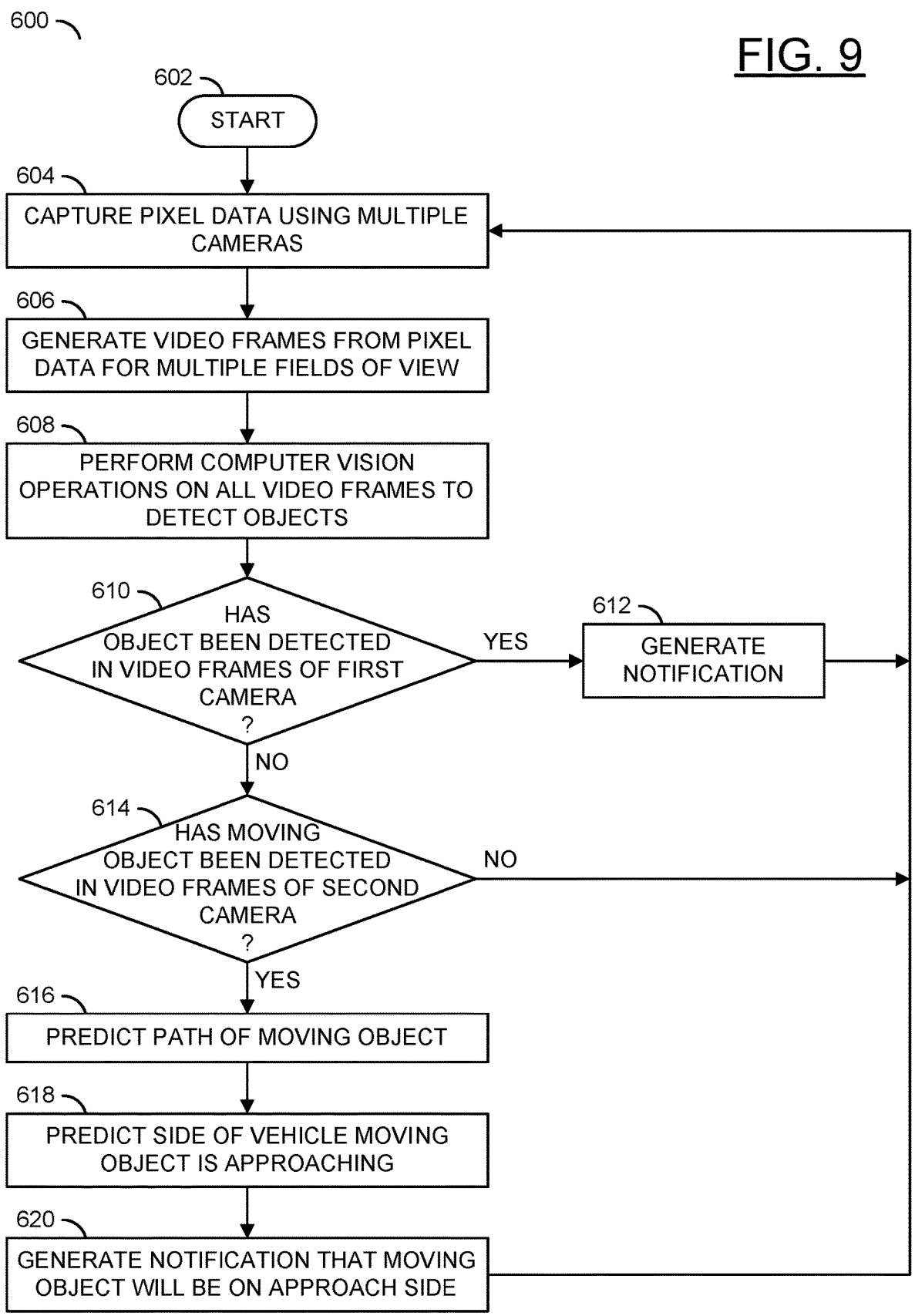
FIG. 9 is a flow diagram illustrating a method for generating a notification in response to a predicted path of a moving object.

Referring to FIG. 9, a method (or process) 600 is shown. The method 600 may generate a notification in response to a predicted path of a moving object. The method 600 generally comprises a step (or state) 602, a step (or state) 604, a step (or state) 606, a step (or state) 608, a decision step (or state) 610, a step (or state) 612, a decision step (or state) 614, a step (or state) 616, a step (or state) 618, and a step (or state) 620.

The step 602 may start the method 600. In the step 604, the apparatus 100 may capture pixel data using multiple cameras 102a-102n. In an example, the sensors 140a-140n may be configured to capture the pixel data (e.g., FRAMES_A-FRAMES_N) from the light input received by the lenses 112a-112n. Next, in the step 606, the processors 106a-106n may generate video frames from the pixel data for multiple fields of view. In an example, the rear capture device 102c may capture the rear field of view 252a-252b, the driver side capture device 102g may generate the rear driver field of view 254a-254b and the passenger side capture device 102d may generate the rear passenger side field of view 256a-256b. In response, the video processing pipeline 156 may generate a rear view video frame (e.g., similar to the video frame 450b shown in association with FIG. 6), a driver side video frame and a passenger side video frame (e.g., similar to the video frame 450a shown in association with FIG. 6). In the step 608, the CNN module 150 may perform the computer vision operations on all the video frames generated to detect objects. The computer vision operations may detect and/or classify various objects (e.g., other vehicles, roads, road markings, signs, pedestrians, buildings, animals, vehicle occupants, etc.). The results of the computer vision operations may be used to perform various features (e.g., autonomous driving, collision warnings, navigation, driver monitoring, etc.). Next, the method 600 may move to the decision step 610.

In the decision step 610, the decision module 158 may determine whether an object has been detected in the video frames generated from the pixel data captured by one of the cameras 102a-102n. In an example, the decision module 158 may determine whether an object has been detected in the passenger view video frame 450a generated from the capture device 102d. If an object has been detected, the method 600 may move to the step 612. In the step 612, the processors 106a-106n may generate the signal VCTRL to generate a notification. In an example, the object detected may be a cyclist visible in the passenger side view video frame and the notification may be generated to warn the driver 202 of the presence of the cyclist. Next, the method 600 may return to the step 604. In the decision step 610, if an object has not been detected, the method 600 may move to the decision step 614.

In the decision step 614, the decision module 158 may determine whether an object has been detected in the video frames generated from the pixel data captured by another one of the cameras 102a-102n. In an example, the decision module 158 may determine whether the moving object 420 has been detected in the rear view video frame 450b generated from the capture device 102c. If no moving object 420 has been detected, the method 600 may return to the step 604. If the moving object 420 has been detected, then the method 600 may move to the step 616.

In the step 616, the processors 106a-106n may predict the path of the moving object 420. The predicted path PP may be determined in response to analyzing the movement of the detected object 460 in the rear camera video frame 450b (and subsequent video frames generated in response to the pixel data captured by the capture device 102c). Next, in the step 618, the processors 106a-106n may predict the side of the ego vehicle 50 that the moving object 420 may be approaching. In an example, if the moving object 420 is behind the ego vehicle 50 and passing on the right, then the approach side may be the passenger side 430. In the step 620, the processors 106a-106n may generate the signal VCTRL to generate the notification that the moving object 420 will be on the approach side (e.g., the passenger side 430) of the ego vehicle 50. The notification may be an early detection of the moving object 420. For example, the notification (e.g., the audio notification 508) may be generated before the moving object 420 is visible in the video frames generated by the capture device 102d on the approach side 430 of the ego vehicle 50 (e.g., before the cyclist 420 is visible in the video frame 450a). Next, the method 600 may return to the step 604.

Referring to FIG. 10, a method (or process) 650 is shown. The method 650 may determine a predicted path of an object. The method 650 generally comprises a step (or state) 652, a step (or state) 654, a decision step (or state) 656, a step (or state) 658, a step (or state) 660, a step (or state) 662, a step (or state) 664, a step (or state) 666, a decision step (or state) 668, a step (or state) 670, a step (or state) 672, a step (or state) 674, a step (or state) 676, and a step (or state) 678.

The step 652 may start the method 650. In the step 654, the processors 106a-106n may perform the computer vision operations on the rear view video frame (e.g., the video frame captured by the rear-end mounted camera 102c). In an example, the processors 106a-106n may perform the computer vision operations on video frames similar to the video frame 450b and subsequently captured video frames. Next, the method 650 may move to the decision step 656.

In the decision step 656, the processors 106a-106n may determine whether an object has been detected. If an object has not been detected, then the method 650 may move to the step 658. The step 658 may end the method 650. In the decision step 656, if an object has been detected, then the method 650 may move to the step 660.

In the step 660, the CNN module 150 may determine the characteristics of the detected object in a first video frame. The characteristics may comprise the size, shape, color, location of the object within the video frame, etc. Next, in the step 662, the processors 106a-106n may perform the computer vision operations on the next rear view video frame (e.g., a subsequently captured video frame captured by the rear-end mounted camera 102c). In the step 664, the CNN module 150 may determine the characteristics of the detected object 460 from the subsequently captured video frame (e.g., detect similar characteristics as detected in the previous video frame). Next, in the step 666, the processors 106a-106n may compare the characteristics detected in the previous video frame to the characteristics detected in the subsequent video frame. In an example, the processors 106a-106n may determine how far the detected object 460 has moved between frames, how much the size of the detected object 460 has changed between frames, whether an orientation of the detected object 460 has changed, etc. Next, the method 650 may move to the decision step 668.

In the decision step 668, the processors 106a-106n may determine whether the detected object 460 is moving. In an example, the change in characteristics of the detected object 460 may be used to determine whether the detected object 460 is moving relative to the ego vehicle 50. If the detected object 460 is not moving, then the method 650 may move to the step 678. If the detected object 460 is moving, then the method 650 may move to the step 670.

Figure 11:
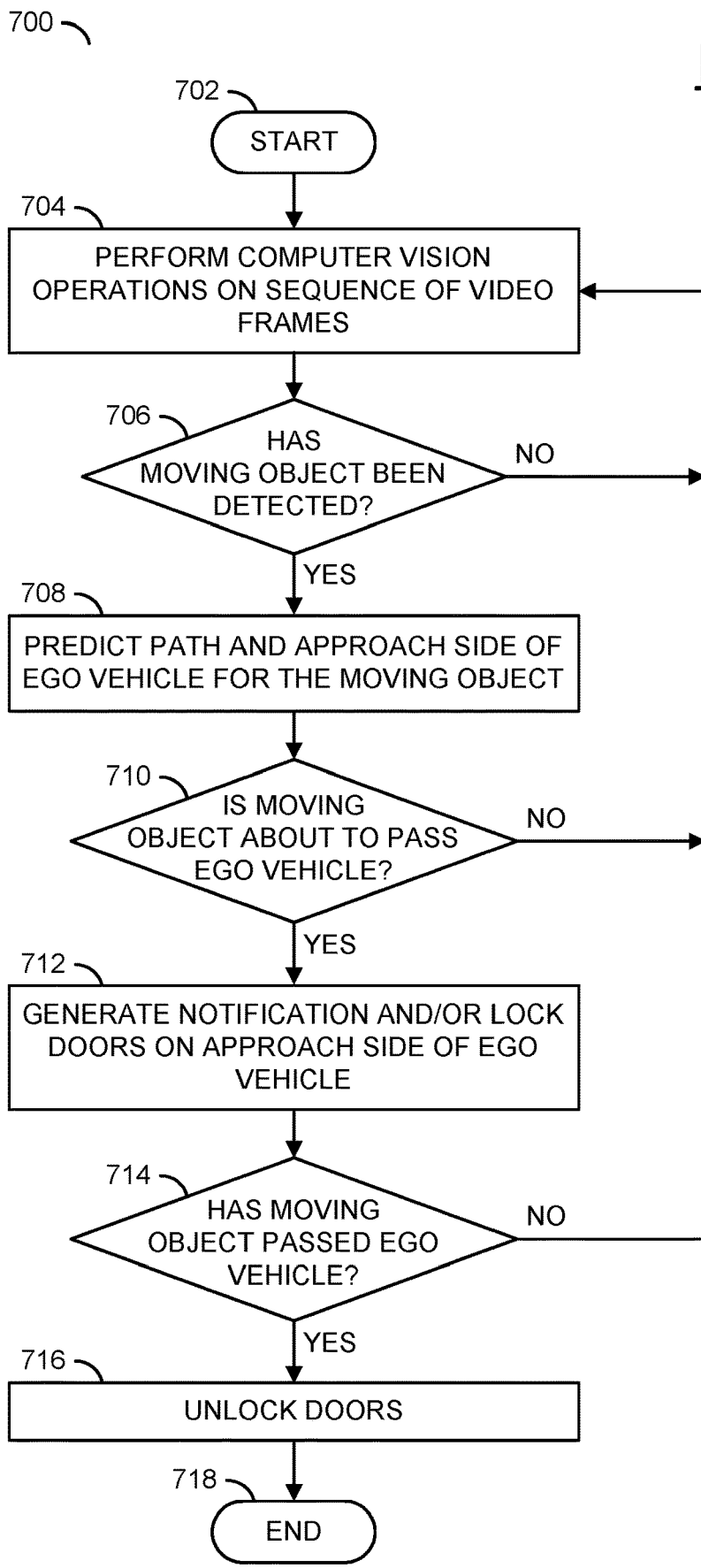
FIG. 11 is a flow diagram illustrating a method for preventing a car door from opening when a cyclist is passing by the ego vehicle.

In the step 670, the processors 106a-106n may determine a trajectory (e.g., speed and/or direction) of the moving object 420. Next, in the step 672, the processors 106a-106n may compare the speed and/or direction of the moving object 420 to the characteristics of the road 402. In the step 674, the processors 106a-106n may determine the predicted path PP of the moving object 420. The predicted path PP may be determined in response to the determined speed, direction and/or assumptions about the detected object 460 (e.g., the shape of the road, the likelihood that the detected object 460 will follow the lanes, etc.). Next, in the step 676, the processors 106a-106n may update the predicted path PP using data from incoming video frames. For example, the steps in the method 650 may be repeated to continually monitor the moving object 420 and/or update the predicted path PP. Next, the method 650 may move to the step 678. The step 678 may end the method 650. Referring to FIG. 11, a method (or process) 700 is shown.

The method 700 may prevent a car door from opening when a cyclist is passing by the ego vehicle. The method 700 generally comprises a step (or state) 702, a step (or state) 704, a decision step (or state) 706, a step (or state) 708, a decision step (or state) 710, a step (or state) 712, a decision step (or state) 714, a step (or state) 716, and a step (or state) 718.

The step 702 may start the method 700. In the step 704, the processors 106a-106n may perform the computer vision operations on a sequence of video frames. Next, the method 700 may move to the decision step 706. In the decision step 706, the processors 106a-106n may determine whether a moving object has been detected. If no moving object has been detected, the method 700 may return to the step 704. If a moving object has been detected, then the method 700 may move to the step 708.

In the step 708, the processors 106a-106n may determine the predicted path PP and the approach side of the ego vehicle 50 for the moving object 420 (e.g., determine which side of the ego vehicle 50 that the moving object 420 is approaching based on the predicted path PP). Next, the method 700 may move to the decision step 710. In the decision step 710, the processors 106a-106n may determine whether the moving object 420 is about to pass the ego vehicle 50. For example, whether the moving object 420 is about to pass the ego vehicle 50 may be determined based on the predicted path PP and/or the relative speed of the ego vehicle 50 and the moving object 420. If the moving object 420 is not about to pass the ego vehicle 50, then the method

700 may return to the step 704. If the moving object 420 is about to pass the ego vehicle 50, then the method 700 may move to the step 712.

In the step 712, the processors 106a-106n may generate the signal VCTRL to generate the notification and/or lock the door(s) on the approach side of the ego vehicle 50. In an example, the notification may be the audio notification 508, the text notification 572, the video notification 574 and/or the directional notification 582. In an example, the signal VCTRL may be configured to adjust the electronic lock control 510 to lock one or more doors of the ego vehicle 50. Next, the method 700 may move to the decision step 714.

In the decision step 714, the processors 106a-106n may determine whether the moving object 420 has passed the ego vehicle 50. If the moving object 420 has not passed the ego vehicle 50, then the method 700 may return to the step 704. If the moving object 420 has passed the ego vehicle 50, then the method 700 may move to the step 716. In the step 716, the processors 106a-106n may unlock the doors. For example, the processors 106a-106n may generate the signal VCTRL to adjust the electronic door lock 510 to unlock one or more doors of the ego vehicle 50. Next, the method 700 may move to the step 718. The step 718 may end the method 700.

Figure 12:
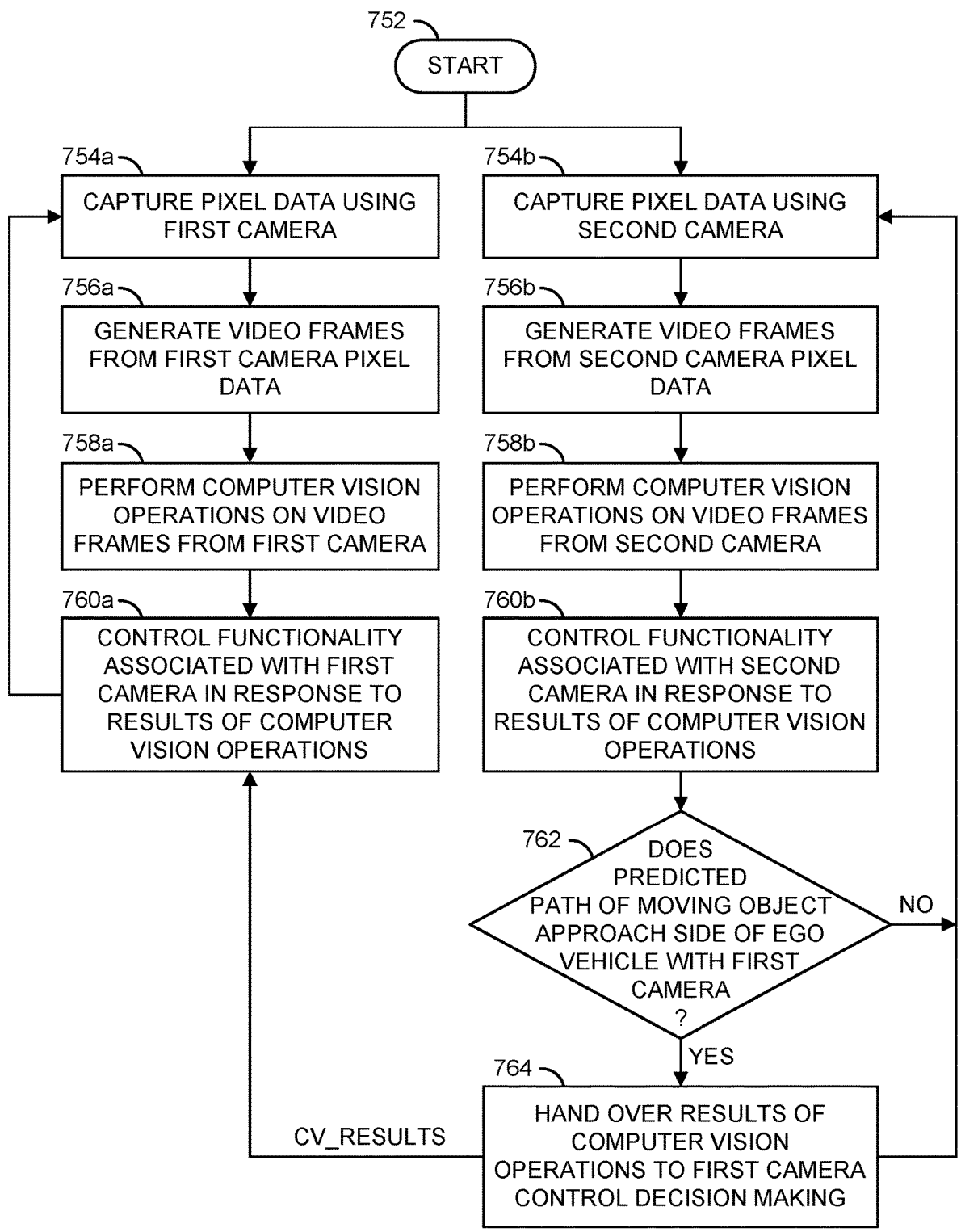
FIG. 12 is a flow diagram illustrating a method for handing over data from camera to camera.

Referring to FIG. 12, a method (or process) 750 is shown. The method 750 may hand over data from camera to camera. The method 750 generally comprises a step (or state) 752, a step (or state) 754a, a step (or state) 754b, a step (or state) 756a, a step (or state) 756b, a step (or state) 758a, a step (or state) 758b, a step (or state) 760a, a step (or state) 760b, a decision step (or state) 762, and a step (or state) 764.

The step 752 may start the method 750. Next, the method 750 may move to the step 754a and the step 754b. Generally, the steps 754a-760a and the steps 754b-760b may be capable of being performed in parallel. For example, the operations performed in the steps 754a-760a may correspond to one of the capture devices 102a-102n (e.g., the passenger side capture device 102d) and the operations performed in the steps 754b-760b may correspond to another of the capture devices 102a-102n (e.g., the rear-mounted capture device 102c). The processors 106a-106n may be configured to operate on the separate input of pixel data from each of the capture devices 102a-102n concurrently. While the operations may generally be performed in parallel, various steps may be prioritized, started and/or completed at different times.

In the step 754a, the capture device 102d may capture pixel data. In the step 754b, the capture device 102c may capture pixel data. In the step 756a, the processors 106a-106n may generate video frames from the pixel data captured by the capture device 102d. In the step 756b, the processors 106a-106n may generate video frames from the pixel data captured by the capture device 102c. In the step 758a, the CNN module 150 may perform the computer vision operations on the video frames generated from the capture device 102d. In the step 758b, the CNN module 150 may perform the computer vision operations on the video frames generated from the capture device 102c.

In the step 760a, the processors 106a-106n may use the results of the computer vision operations to control functionality associated with the capture device 102d. Next, the method 750 may return to the step 754a. In the step 760b, the processors 106a-106n may use the results of the computer vision operations to control functionality associated with the capture device 102c. Next, the method 750 may move to the decision step 762.

In the decision step 762, the processors 106a-106n may determine whether the predicted path PP of the moving object 420 approaches the side of the ego vehicle 50 with the capture device 102d (e.g., the approach side is the passenger side 430). If not, the method 750 may return to the step 754b. If the predicted path PP does indicate that the moving object 420 may approach the side of the ego vehicle 50 with the capture device 102d, then the method 750 may move to the step 764.

In the step 764, the processors 106a-106n may hand over the results (e.g., CV_RESULTS) of the computer vision operations determined from analyzing the video frames (e.g., the video frame 450b) generated from the capture device 102c to the decision module 158 for controlling the decision making for the functionality associated with the capture device 102d. For example, the results CV_RESULTS may be used in the step 760a along with the results of the computer vision operations performed on the video frames generated from the capture device 102d. Next, the method 750 may return to the step 754b.

Results of the computer vision operations performed by the processors 106a-106n may be used to control a specific set of functionality (e.g., sub-systems) of the apparatus 100 and/or the ego vehicle 50. In some embodiments, the results of the computer vision operations from analyzing the video frames generated from one capture device may control different functionality than the results of the computer vision operations from analyzing the video frames from another one of the capture devices 102a-102n. In an example, notifications about objects to the right of the ego vehicle 50 may be generated in response to the results of the computer vision operations performed on the video frames generated from the capture device 102d but not from the results of the computer vision operations performed on the video frames generated from the capture device 102g. In another example, a warning that the driver 202 is falling asleep may be generated in response to the computer vision operations performed on the video frames generated from the capture device 102a directed at the interior 502 but not from the results of the computer vision operations performed on the video frames generated from the capture device 102c (video frames of behind the ego vehicle 50).

Controlling the specific functionality (or sub-systems) using the results of the computer vision operations from specific capture devices 102a-102n may be performed for security, efficiency and/or because particular data may be irrelevant. In an example, for driver monitoring, data behind the ego vehicle 50 (e.g., from the capture devices 102c, 102d and/or 102g) may be irrelevant. Ignoring irrelevant information may limit computations performed by the processors 106a-106n and/or reduce power consumption. In one example, a sub-system may comprise blind spot detection. In another example, a sub-system may comprise a reverse (or back-up) camera. In yet another example, a sub-system may comprise a braking assist functionality. In still another example, a sub-system may comprise a driver monitoring functionality (e.g., drowsiness, distracted driving, hands on the wheel, etc.). The types of sub-systems controlled by the apparatus 100 and/or the capture devices 102a-102n used to control the various sub-systems may be varied according to the design criteria of a particular implementation.

The apparatus 100 may be configured to hand off data generated from the computer vision operations performed on video frames from one capture device to another. Handing off data may provide more information for the decision making. Handing off data may be performed in specific circumstances (e.g., to limit the amount of data transferred between cameras). For example, the specific circumstances may be determined based on the predicted path PP of the moving object 420. In an example, handing off data between cameras may comprise sharing results of computer vision operations (e.g., CV_RESULTS) between various decision making threads. The decision making threads may be operations performed in parallel by the decision module 158. In an example, one decision making thread may be to determine whether to provide the driver 202 a notification in response to detecting an object in a blind spot of the ego vehicle 50. In another example, one decision making thread may be to determine whether to alert the driver 202 to keep eyes on the road. The types of decision making threads operated on by the decision module 158 may be varied according to the design criteria of a particular implementation. In some embodiments, the sensor fusion module 152 may be configured to handle sharing data from the results of the computer vision operations of each camera and/or data read from the sensors 114. In one example, the notification of an object such as the cyclist 420 being on the passenger side of the ego vehicle 50 may be determined by performing the computer vision operations on the video frames (e.g., the video frame 450*a*) captured by the capture device 102*d*. The results of the computer vision operations performed on the video frames (e.g., the video frame 450*b*) generated from the capture device 102*c* may be provided to the decision module 158 to provide additional information for determining whether to generate the notification. The results of the computer vision operations from the capture device 102*c* (e.g., CV_RESULTS) may be handed off in response to determining that the predicted path PP may indicate that the approach side of the moving object 420 may be the passenger side 430. By receiving the results of the computer vision operations corresponding to the capture device 102*c*, the decision module 158 may have access to the results of the computer vision operations from the capture device 102*d* and the capture device 102*c* instead of only the results from the capture device 102*d* alone.

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data corresponding to an exterior view from a vehicle generated by a plurality of capture devices; and
   a processor configured to (i) process said pixel data arranged as video frames corresponding to each of said plurality of capture devices from said pixel, (ii) perform computer vision operations on said video frames to detect (a) a moving object and (b) a shape of a roadway in said video frames, (iii) determine a predicted path of said moving object with respect to said vehicle in response to a direction of said moving object with respect to said shape of said roadway, (iv) predict an approach side of said vehicle of said moving object based on (a) said predicted path of said moving object and (b) said shape of said roadway detected with respect to said vehicle, and (v) generate a notification in response to said predicted path and said approach side of said vehicle, wherein (a) a first of said plurality of capture devices is located on said approach side of said vehicle, (b) a current location of said moving object is not in a field of view of said video frames generated from said pixel data captured by said first of said capture devices, (c) said moving object is detected in said video frames generated from said pixel data captured by a second of said plurality of capture devices that is not located on said approach side of said vehicle and (d) said notification is generated before said moving object is in said field of view.

2. The apparatus according to claim 1, wherein said processor performs said computer vision operations using a dedicated hardware module configured to (i) extract feature points from said video frames by analyzing (a) pixels of said video frames and (b) groups of pixels of said video frames, (ii) calculate descriptors based on said feature points and (iii) compare said descriptors to stored reference descriptors to determine whether said pixels of said video frames correspond to a particular object.

3. The apparatus according to claim 1, wherein (i) said moving object is a cyclist and (ii) said cyclist is driving on a curved road behind said vehicle.

4. The apparatus according to claim 1, wherein (i) said approach side of said vehicle is a passenger side of said vehicle, (ii) said first of said plurality of capture devices is mounted on a side view mirror of said vehicle and (iii) said second of said plurality of capture devices is located on a rear end of said vehicle.

5. The apparatus according to claim 1, wherein (i) said approach side of said vehicle is a passenger side of said vehicle, (ii) said first of said plurality of capture devices is mounted on a side view mirror of said vehicle on said passenger side and (iii) said second of said plurality of capture devices is mounted on a driver side mirror of said vehicle.

6. The apparatus according to claim 1, wherein said predicted path of said moving object is determined in response to (a) measuring a speed of said moving object and (B) determining a trajectory of said moving object.

7. The apparatus according to claim 1, wherein (i) said plurality of capture devices implement a three-camera electronic mirror system, (ii) said first of said plurality of capture devices is implemented on a passenger side mirror of said vehicle, (iii) said second of said plurality of capture devices is implemented on a rear end of said vehicle, (iv) a third of said plurality of capture devices is implemented on a driver side mirror of said vehicle and (iv) each of said plurality of capture devices is directed to capture said pixel data behind said vehicle.

8. The apparatus according to claim 1, wherein (i) said notification comprises a message generated on a display and (ii) said display is configured to output video of said field of view.

9. The apparatus according to claim 1, wherein said field of view of said first of said plurality of capture devices is partially obstructed by said vehicle.

10. The apparatus according to claim 1, wherein said notification comprises an audio warning.

11. The apparatus according to claim 10, wherein said audio warning is generated in said vehicle when an occupant of said vehicle starts opening a door of said approach side of said vehicle.

12. The apparatus according to claim 11, wherein said processor is configured to detect said occupant opening said door by performing said computer vision operations on interior video frames arranged from pixel data of an interior view of said vehicle generated by a camera configured to capture said interior view of said vehicle.

13. The apparatus according to claim 1, wherein (i) said processor is further configured to generate a control signal in response to said predicted path and (ii) said control signal is configured to prevent a door from opening on said approach side of said vehicle.

14. The apparatus according to claim 13, wherein (i) said control signal is configured to lock said door when said predicted path indicates said moving object is approaching said vehicle and (ii) said control signal is generated to unlock said door after said moving object passes by said door.

15. The apparatus according to claim 1, wherein (a) said processor is further configured to (i) determine an amount of time that said moving object will be visible in said field of view of said video frames generated from said pixel data captured by said first of said capture devices, (ii) generate said notification if said amount of time is insufficient for a driver of said vehicle to react to said moving object and (iii) suppress said notification if said amount of time is sufficient for said driver of said vehicle to react to said moving object and (b) said amount of time is determined in response to (i) said predicted path of said moving object and (ii) a relative speed between said vehicle and said moving object.

16. The apparatus according to claim 1, wherein results of said computer vision operations performed on said video frames generated from said second of said plurality of capture devices are provided to be used by said processor along with second results from said computer vision operations performed on said video frames generated from said first of said plurality of capture devices.

17. The apparatus according to claim 16, wherein (i) a first set of functionality is controlled by said processor in response to said computer vision operations performed on said video frames generated from said first of said plurality of capture devices, (ii) a second set of functionality is controlled by said processor in response to said computer vision operations performed on said video frames generated from said second of said plurality of capture devices and (iii) said results are used to control said first set of functionality.

18. The apparatus according to claim 1, wherein said computer vision operations are performed by (a) applying a feature detection window to each of a plurality of layers in each of the video frames and (b) sliding said feature detection window along each of said plurality of layers.

19. The apparatus according to claim 18, wherein said computer vision operations further comprise applying a convolution operation using matrix multiplication of said plurality of layers defined by said feature detection window.

20. The apparatus according to claim 18, wherein said computer vision operations further comprise (i) performing feature extraction based on weight values for each of said plurality of layers in said video frames and (ii) said weight values are determined by said processor analyzing training data prior to said feature extraction.

* * * * *